(12) United States Patent
Noh et al.

(10) Patent No.: US 9,793,811 B2
(45) Date of Patent: Oct. 17, 2017

(54) BUCK CONVERTER AND BOOST CONVERTER WITH DEAD TIME ADJUSTMENT

(71) Applicant: SAMSUNG ELECTRONICS CO., LTD., Suwon-si, Gyeonggi-Do (KR)

(72) Inventors: Gwang-Yol Noh, Anyang-si (KR); Yus Ko, Yongin-si (KR); Dongjin Keum, Suwon-si (KR); Hwayeal Yu, Bucheon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 68 days.

(21) Appl. No.: 14/735,836

(22) Filed: Jun. 10, 2015

(65) Prior Publication Data

US 2016/0036328 A1  Feb. 4, 2016

(30) Foreign Application Priority Data

Aug. 4, 2014 (KR) .................. 10-2014-0099936

(51) Int. Cl.
  *H02M 3/158* (2006.01)
(52) U.S. Cl.
  CPC ....... *H02M 3/1588* (2013.01); *Y02B 70/1466* (2013.01)
(58) Field of Classification Search
  CPC ........................................ H02M 1/00–11/00
  See application file for complete search history.

(56) References Cited

U.S. PATENT DOCUMENTS

| | | |
|---|---|---|
| 6,294,954 B1 | 9/2001 | Melanson |
| 6,661,208 B2 | 12/2003 | Rutter et al. |
| 7,057,380 B2 | 6/2006 | Kuo et al. |
| 7,098,640 B2 | 8/2006 | Brown |
| 7,301,376 B2 | 11/2007 | Capodivacca et al. |
| 7,391,194 B2 | 6/2008 | Brown |
| 7,482,655 B2 | 1/2009 | Nadd |
| 7,990,211 B2 | 8/2011 | Kawai et al. |
| 8,258,842 B2 | 9/2012 | Wang |
| 8,324,880 B2 | 12/2012 | Wang et al. |
| 8,508,207 B2 | 8/2013 | Burns et al. |
| 8,659,345 B2 | 2/2014 | Xu et al. |

(Continued)

FOREIGN PATENT DOCUMENTS

| | | |
|---|---|---|
| CN | 101694992 | 4/2010 |
| EP | 1230734 | 8/2002 |
| EP | 1418666 | 5/2004 |

*Primary Examiner* — Harry Behm
*Assistant Examiner* — Peter Novak
(74) *Attorney, Agent, or Firm* — F. Chau & Associates, LLC

(57) ABSTRACT

A voltage converter includes first and second charging elements, first and second switches, and first and second switch controllers. The first switch controller adjusts a first activation timing of a first control signal in response to a pulse width modulation signal, a switch signal, and a first control signal. The first control signal is a signal for controlling the first switch. The second switch controller adjusts a second activation timing of a second control signal in response to the pulse width modulation signal, the first control signal, and a second control signal. The second control signal is a signal for controlling the second switch.

19 Claims, 20 Drawing Sheets

(56) References Cited

U.S. PATENT DOCUMENTS

| | | | |
|---|---|---|---|
| 2011/0012577 A1* | 1/2011 | Wang | H02M 1/38 323/283 |
| 2012/0032657 A1 | 2/2012 | Dequina | |
| 2013/0147458 A1* | 6/2013 | Zhak | G05F 3/08 323/311 |
| 2015/0256074 A1* | 9/2015 | Biondi | H02M 1/38 323/271 |

* cited by examiner

US 9,793,811 B2

BUCK CONVERTER AND BOOST CONVERTER WITH DEAD TIME ADJUSTMENT

CROSS-REFERENCE TO RELATED APPLICATION

This application claims priority under 35 U.S.C. §119 to Korean Patent Application No. 10-2014-0099936, filed on Aug. 4, 2014, in the Korean Intellectual Property Office (KIPO), the disclosure of which is incorporated by reference herein in its entirety.

TECHNICAL FIELD

The present inventive concept relates to an electronic circuit, and more particularly to, a voltage converter and a voltage conversion method thereof.

DISCUSSION OF THE RELATED ART

An electronic device may include a plurality of intellectual properties (IPs) that conduct various functions.

The IPs of the electronic device may use various voltages according to their functions. In this regard, a voltage converter that converts an input voltage into the various voltages may be used. The voltage converter may be a buck converter that lowers the input voltage and a booster converter that boosts the input voltage.

SUMMARY

According to an exemplary embodiment of the present inventive concept, a voltage converter is provided. The voltage converter includes a first charging element, a second charging element, a first switch, a second switch, a first switch controller, and a second switch controller. The first charging element is connected between an output node and a switch node. The second charging element is connected between the output node and a ground node. The first switch is configured to control a connection between an input node supplied with an input voltage and the switch node in response to a first control signal. The second switch is configured to control a connection between the switch node and the ground node in response to a second control signal. The first switch controller is configured to adjust a first activation timing of the first control signal in response to a pulse width modulation signal, the first control signal, and the second control signal, and to activate the first control signal using the adjusted first activation timing. The second switch controller is configured to adjust a second activation timing of the second control signal in response to the pulse width modulation signal, a switch signal of the switch node, and the first control signal, and to activate the second control signal using the adjusted second activation timing.

In an exemplary embodiment of the present inventive concept, the second switch controller may advance the second activation timing when a level of the switch signal is lower than a ground voltage upon activation of the second control signal.

In an exemplary embodiment of the present inventive concept, the second switch controller may delay the second activation timing when a level of the switch signal is not lower than a ground voltage upon activation of the second control signal.

In an exemplary embodiment of the present inventive concept, the second switch controller may output the second control signal obtained by conducting a logical operation between the pulse width modulation signal and a delay signal of the pulse width modulation signal and inverting a result of the logical operation. The second switch controller may adjust the second activation timing by changing an amount of delay between the pulse width modulation signal and the delay signal of the pulse width modulation signal.

In an exemplary embodiment of the present inventive concept, the second switch controller may include a first pulse generator, a second pulse generator, a flip-flop, a counter, a delay unit, a decoder, a logical gate, and an inverter. The first pulse generator may be configured to receive the second control signal and the switch signal and to output a pulse signal when a level of the switch signal is not lower than a ground voltage upon activation of the second control signal. The second pulse generator may be configured to output a reset signal in response to the pulse width modulation signal. The flip-flop may be configured to receive the pulse signal and the reset signal, and to output an output signal. The counter may be configured to decrease a delay count when the output signal has a first level, to increase the delay count when the output signal has a second level different from the first level, and to output the delay count. The increasing or decreasing of the delay count may be synchronized with the pulse width modulation signal. The delay unit may be configured to receive the pulse width modulation signal and to delay the pulse width modulation signal using a plurality of delays in the delay unit. The decoder may be configured to select, as a delay signal, one of outputs of the plurality of delays in response to the delay count. The logical gate may be configured to conduct a logical operation between the pulse width modulation signal and the delay signal. The inverter may be configured to invert an output of the logical gate to output the inverted signal as the second control signal.

In an exemplary embodiment of the present inventive concept, the first switch controller may delay the first activation timing when the first control signal is activated upon inactivation of the first control signal.

In an exemplary embodiment of the present inventive concept, the first switch controller may advance the first activation timing when the first control signal is not activated upon inactivation of the second control signal.

In an exemplary embodiment of the present inventive concept, the first switch controller may output the first control signal, obtained by conducting a logical operation between the pulse width modulation signal and a delay signal of the pulse width modulation signal and inverting a result of the logical operation. The first switch controller may adjust the first activation timing by changing the amount of delay between the pulse width modulation signal and the delay signal of the pulse width modulation signal.

In an exemplary embodiment of the present inventive concept, the first switch controller may include a first pulse generator, a second pulse generator, a flip-flop, a counter, a delay unit, a decoder, a logical gate, and an inverter. The first pulse generator may be configured to receive the first control signal and the second control signal and to output a pulse signal when the first control signal is activated upon inactivation of the second control signal. The second pulse generator may be configured to output a reset signal in response to the pulse width modulation signal. The flip-flop may be configured to receive the pulse signal and the reset signal, and to output an output signal. The counter may be configured to decrease a delay count when the output signal has a first level, to increase the delay count when the output signal has a second level different from the first level, and to output the delay count. The increasing or the decreasing of the delay count may be synchronized with the pulse width modulation signal. The delay unit may be configured to receive the pulse width modulation signal and to delay the pulse width modulation signal using a plurality of delays in the delay unit. The decoder using a plurality of delays in the delay unit to select, as a delay signal, one of outputs of the plurality of delays in response to the delay count. The logical gate may be configured to conduct a logical operation between the pulse width modulation signal and the delay signal. The inverter may be configured to invert an output of the logical gate to output the inverted signal as the first control signal.

In an exemplary embodiment of the present inventive concept, the voltage converter may further include a feedback controller and a pulse width modulation signal generator. The feedback controller may be configured to generate a control signal according to a level of the switch signal. The pulse width modulation signal generator may be configured to adjust a pulse width of the pulse width modulation signal in response to the control signal.

According to an exemplary of embodiment of the present inventive concept, a voltage converter is provided. The voltage converter includes a first charging element, a second charging element, a first switch, a second switch, a first switch controller, and a second switch controller. The first charging element is connected between an input node, supplied with an input voltage, and a switch node. The second charging element is connected between an output node and a ground node. The first switch is configured to control a connection between the output node and the switch node in response to a first control signal. The second switch is configured to control a connection between the switch node and the ground node in response to a second control signal. The first switch controller is configured to adjust a first activation timing of the first control signal in response to a pulse width modulation signal, a switch signal of the switch node, and the first control signal and to activate the first control signal using the adjusted first activation timing. The second switch controller is configured to adjust a second activation timing of the second control signal in response to the pulse width modulation signal, the first control signal, and the second control signal and to activate the second control signal using the adjusted second activation timing.

In an exemplary embodiment of the present inventive concept, the first switch controller may advance the first activation timing when a level of the switch signal reaches a target level before the first control signal is activated.

In an exemplary embodiment of the present inventive concept, the first switch controller may delay the first activation timing when a level of the switch signal does not reach a target level before the first control signal is activated.

In an exemplary embodiment of the present inventive concept, the first switch controller includes a first pulse generator, a second pulse generator, a flip-flop, a counter, a delay unit, a decoder, a logical gate, and an inverter. The first pulse generator may be configured to receive the first control signal and the switch signal and to output a pulse signal when a level of the switch signal does not reach a target level before the first control signal is activated. The second pulse generator may be configured to output a reset signal in response to the pulse width modulation signal. The flip-flop may be configured to receive the pulse signal and the reset signal, and to output an output signal. The counter may be configured to decrease a delay count when the output signal has a first level, to increase the delay count when the output signal has a second level different from the first level, and to output the delay count. The increasing or the decreasing of the delay count may be synchronized with the pulse width modulation signal. The delay unit may be configured to receive the pulse width modulation signal and to delay the pulse width modulation signal using a plurality of delays in the delay unit. The decoder may be configured to select, as a delay signal, one of outputs of the plurality of delays in response to the delay count. The logical gate may be configured to conduct a logical operation between the pulse width modulation signal and the delay signal. The inverter may be configured to invert an output of the logical gate to output the inverted signal as the first control signal.

In an exemplary embodiment of the present inventive concept, the second switch controller may advance the second activation timing when the second control signal is at an inactive state upon inactivation of the first control signal.

In an exemplary embodiment of the present inventive concept, the second switch controller may delay the second activation timing when the second control signal is activated upon activation of the first control signal.

In an exemplary embodiment of the present inventive concept, the second switch controller may include a first pulse generator, a second pulse generator, a flip-flop, a counter, a delay unit, a decoder, a logical gate, and an inverter. The first pulse generator may be configured to receive the first control signal and the second control signal and to output a pulse signal when the second control signal is activated upon inactivation of the first control signal. The second pulse generator may be configured to output a reset signal in response to the pulse width modulation signal. The flip-flop may be configured receive the pulse signal and the reset signal, and to output an output signal. The counter may be configured to decrease a delay count when the output signal has a first level, to increase the delay count when the output signal has a second level different from the first level, and to output the delay count. The increasing or the decreasing of the delay count may be synchronized with the pulse width modulation signal. The delay unit may be configured to receive the pulse width modulation signal and to delay the pulse width modulation signal using a plurality of delays in the delay unit. The decoder may be configured to select, as a delay signal, one of outputs of the plurality of delays in response to the delay count. The logical gate may be configured to conduct a logical operation between the pulse width modulation signal and the delay signal. The inverter may be configured to invert an output of the logical gate to output the inverted signal as the second control signal.

According to an exemplary embodiment of the present inventive concept, a method of operating a voltage converter is provided. The voltage converter includes a first switch and a second switch serially connected to the first switch via a switch node. The method includes detecting a first signal for controlling the first switch, a second signal for controlling the second switch, and a third signal at the switch node, controlling a turn-on timing of the first switch based on whether the first signal is delayed from the second signal, and controlling a turn-on timing of the second switch based on whether the third signal is lower than a ground voltage.

In an exemplary embodiment of the present inventive concept, the controlling of the turn-on timing of the first switch may include quickening the turn-on timing of the first switch when the first signal is delayed from the second signal and delaying the turn-on timing of the first switch when the first signal is not delayed from the second signal. The controlling of the turn-on timing of the second switch may include quickening a turn-on timing of the second switch when the third signal is lower than a ground voltage and delaying the turn-on timing of the second switch when the third signal is not lower than the ground voltage.

According to an exemplary embodiment of the present inventive concept, a method of operating a voltage converter is provided. The voltage converter includes a first switch and a second switch serially connected to the first switch via a switch node. The method includes detecting a first signal for controlling the first switch, a second signal for controlling the second switch, and a third signal at the switch node, quickening a turn-on timing of the first switch when the third signal reaches a reference level before the first signal is activated, delaying the turn-on timing of the first switch when the third signal does not reach the reference level before the first signal is activated, quickening a turn-on timing of the second switch when the second signal is delayed from the first signal, and delaying the turn-on timing of the second switch when the second signal is not delayed from the first signal.

BRIEF DESCRIPTION OF THE FIGURES

The above and other features of the present inventive concept will become more apparent by describing exemplary embodiments of thereof with reference to the following figures, in which.

DETAILED DESCRIPTION OF THE EMBODIMENTS

Figure 1:
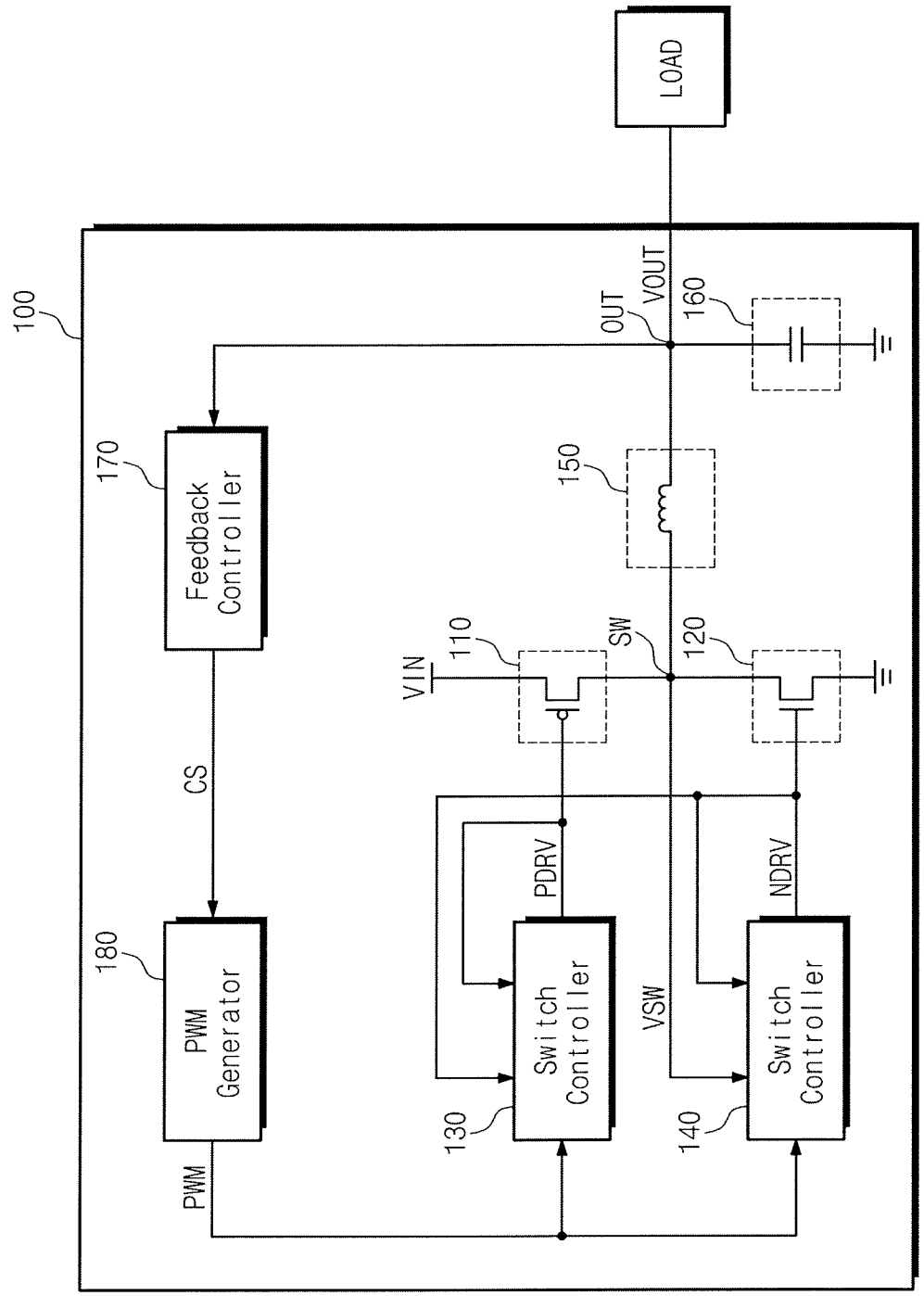
FIG. 1 is a diagram of a voltage converter according to an exemplary embodiment of the present inventive concept.

Exemplary embodiments of the present inventive concept will now be described more in detail with reference to the accompanying drawings. The present inventive concept may, however, be embodied in various forms, and should not be construed as being limited to the exemplary embodiments set forth herein. Like reference numerals may refer to like elements throughout the drawings and specification. In the drawings, the sizes and relative sizes of layers and regions may be exaggerated for clarity.

As used herein, the singular forms "a", "an" and "the" are intended to include the plural forms as well, unless the context clearly indicates otherwise. It will be understood that when an element or layer is referred to as being "on", "connected to", "coupled to", or "adjacent to" another element or layer, it can be directly on, connected, coupled, or adjacent to the other element or layer, or intervening elements or layers may be present.

FIG. 1 is a diagram of a voltage converter 100 according to an exemplary embodiment of the present inventive concept. In an exemplary embodiment of the voltage converter 100, FIG. 1 illustrates a buck converter that generates an output voltage VOUT lower than an input voltage VIN. Referring to FIG. 1, the voltage converter 100 includes a first switch 110, a second switch 120, a first switch controller 130, a second switch controller 140, a first charging element 150, a second charging element 160, a feedback controller 170, and a pulse width modulation (PWM) signal generator 180.

The first switch 110 is connected between an input node, supplied with the input voltage VIN, and a switch node SW. The first switch 110 operates in response to a first control signal PDRV output from the first switch controller 130. The first switch 110 may be formed of, but not limited to, a P-channel metal-oxide-semiconductor (PMOS) transistor.

The second switch 120 is connected between the switch node SW and a ground node. The second switch 120 operates in response to a second control signal NDRV output from the second switch controller 140. The second switch 120 may be formed of, but not limited to, an N-channel metal-oxide-semiconductor (NMOS) transistor.

The first switch controller 130 controls the first switch 110 to activate or inactivate the first control signal PDRV in response to a pulse width modulation signal PWM. The first switch controller 130 adjusts an activation timing of the first control signal PDRV in response to the pulse width modulation signal PWM, the first control signal PDRV, and the second control signal NDRV.

The second switch controller 140 controls the second switch 120 to activate or inactivate the second control signal NDRV in response to the pulse width modulation signal PWM. The second switch controller 140 adjusts an activation timing of the second control signal NDRV in response to the pulse width modulation signal PWM, the second control signal NDRV, and a switch voltage VSW of the switch node SW.

The first charging element 150 is connected between the switch node SW and an output node OUT from which an output voltage VOUT is output. The first charging element 150 may be formed of, but not limited to, an inductor.

The second charging element 160 is connected between the output node OUT and the ground node. The second charging element 160 may be formed of, but not limited to, a capacitor.

The feedback controller 170 detects a level of the output voltage VOUT. The feedback controller 170 outputs a control signal CS, depending on whether a level of the output voltage VOUT is higher or lower than that of a target voltage. When a level of the output voltage VOUT is higher than that of the target voltage, the feedback controller 170 outputs the control signal CS to decrease the output voltage VOUT. When a level of the output voltage VOUT is lower than that of the target voltage, the feedback controller 170 outputs the control signal CS to increase the output voltage VOUT.

The pulse width modulation signal generator 180 generates the pulse width modulation signal PWM in response to the control signal CS. For example, when the control signal CS indicates to increase the output voltage VOUT, the pulse width modulation signal generator 180 may decrease (or increase) a pulse width of the pulse width modulation signal PWM. When the control signal CS indicates to decrease the output voltage VOUT, the pulse width modulation signal generator 180 may increase (or decrease) the pulse width of the pulse width modulation signal PWM.

Figure 2:
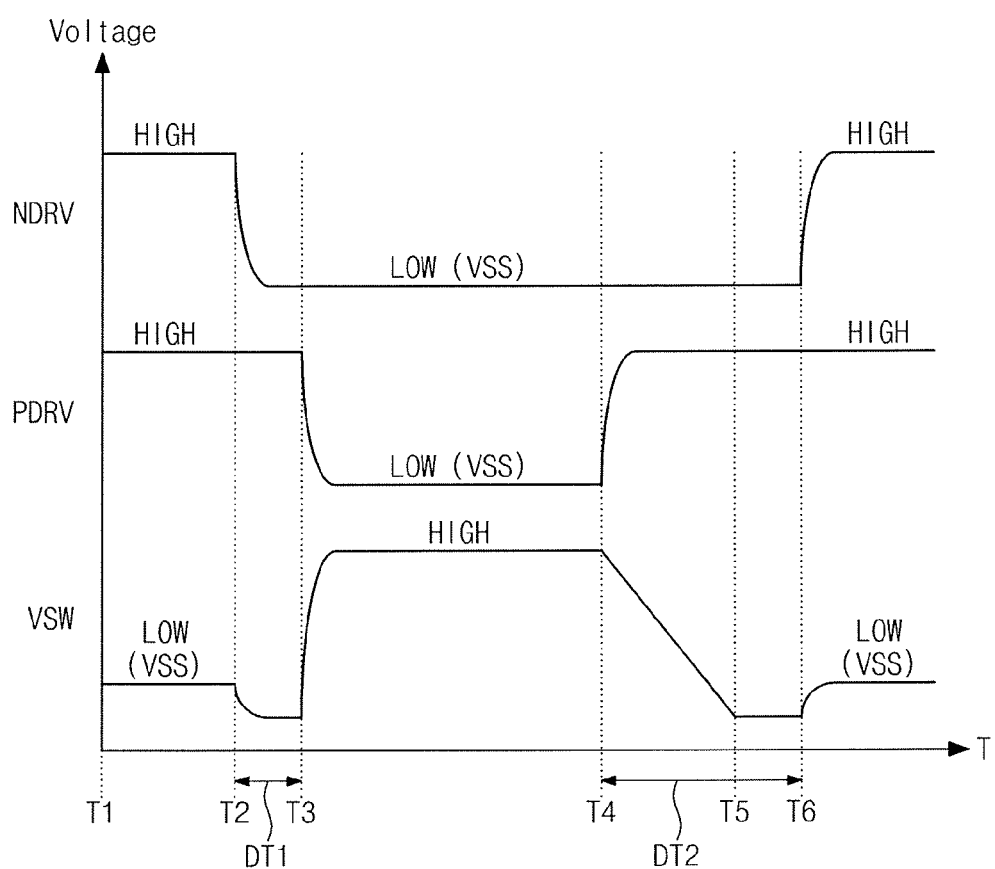
FIG. 2 shows variations of a first control signal, a second control signal, and a switch voltage of a voltage converter with the lapse of time, according to an exemplary embodiment of the present inventive concept.

FIG. 2 shows variations of a first control signal PDRV, a second control signal NDRV, and a switch voltage VSW of a voltage converter 100 with the lapse of time T, according to an exemplary embodiment of the present inventive concept.

Referring to FIGS. 1 and 2, at T1, the first control signal PDRV and the second control signal NDRV have high levels. The high levels of the first and second control signals PDRV and NDRV correspond to a level of an input voltage VIN. The first switch 110 is turned off when the first control signal PDRV has the high level, and the second switch 120 is turned on when the second control signal NDRV has the high level. At T1, the switch voltage VSW has a low level (e.g., the ground voltage VSS) because the switch node SW is grounded through the second switch 120.

At T2, the second control signal NDRV transitions to a low level (e.g., the ground voltage VSS) and thus, the second switch 120 is turned off. In this case, the second switch 120 acts as a diode (hereinafter, referred to as a virtual diode) which is connected between the switch node SW and the ground node. For example, an N-type junction of the second switch 120 connected with the switch node SW acts as a cathode of the virtual diode, and an N-type junction and a P-type body of the second switch 120, which are connected in common with the ground node, act as an anode of the virtual diode.

A current path including the second switch 120, a first charging element 150, and a second charging element 160 is formed when the second switch 120 acts as the virtual diode. A voltage drop occurs due to the second switch 120 acting as the virtual diode, and thus, the switch voltage VSW of the switch node SW becomes lower than the ground voltage VSS. For example, the switch voltage VSW may become lower than the ground voltage VSS by a threshold voltage of the virtual diode.

At T3, the first control signal PDRV transitions to a low level (e.g., the ground voltage VSS), for example, the first switch transistor 110 is turned on. At this time, the switch node SW is connected with an input node through the first switch 110, and thus, the switch voltage VSW of the switch node SW may be increased up to a high level, for example, a level of the input voltage VIN. When the first switch 110 is turned on, the first charging element 150 and the second charging element 160 are charged by the input voltage VIN. In addition, the input voltage VIN is supplied to a load connected to the output node OUT as a power source.

At T4, the first control signal PDRV transitions to a high level, and thus, the first switch 110 is turned off. A current path including the virtual diode of the second switch 120, the first charging element 150, and the second charging element 160 is formed when the first and second switches 110 and 120 are turned off. In addition, a power charged in the first and second charging elements 150 and 160 is supplied to the load. As the power is consumed by the load, the switch voltage VSW of the switch node SW decreases.

At T5, as the power is continuously consumed by the load, the switch voltage VSW of the switch node SW decreases up to a level lower than the ground voltage VSS. For example, the switch voltage VSW may become lower than the ground voltage VSS by a threshold voltage of the virtual diode of the second switch 120.

At T6, the second control signal NDRV transitions to a high level, for example, the second switch 120 is turned on. At this time, the switch node SW is grounded through the second switch 120 to have the ground voltage VSS. A current path including the second switch 120, the first charging element 150, and the second charging element 160 is formed, and thus, a power charged in the first and second charging elements 150 and 160 is consumed by the load.

As illustrated in FIG. 2, the first switch 110 and the second switch 120 are alternately turned on. For example, the second switch 120 is inactivated at T2, the first switch 110 is activated at T3, the first switch 110 is inactivated at T4, and the second switch 120 is activated at T6.

The first switch 110 and the second switch 120 are turned off between T2 and T3, which is referred to as a first dead time DT1. The first switch 110 and the second switch 120 are turned off between T5 and T6, which is referred to as a second dead time DT2.

When the first and second switches 110 and 120 are turned on, the input node supplied with the input voltage VIN is short-circuited with the ground node. The first and second dead times DT1 and DT2 prevent the input node and the ground node from being short-circuited with each other, and thus a voltage converter 110 may be stabilized. In addition, the second switch 120 acts as a virtual diode during the first and second dead times DT1 and DT2. In this case, since power loss occurs when current flows through the virtual diode, the first and second dead times DT1 and DT2 decrease conversion efficiency of the voltage converter 100. Thus, the first and second dead times DT1 and DT2 may be decreased to reduce power loss due to the virtual diode.

Figure 3:
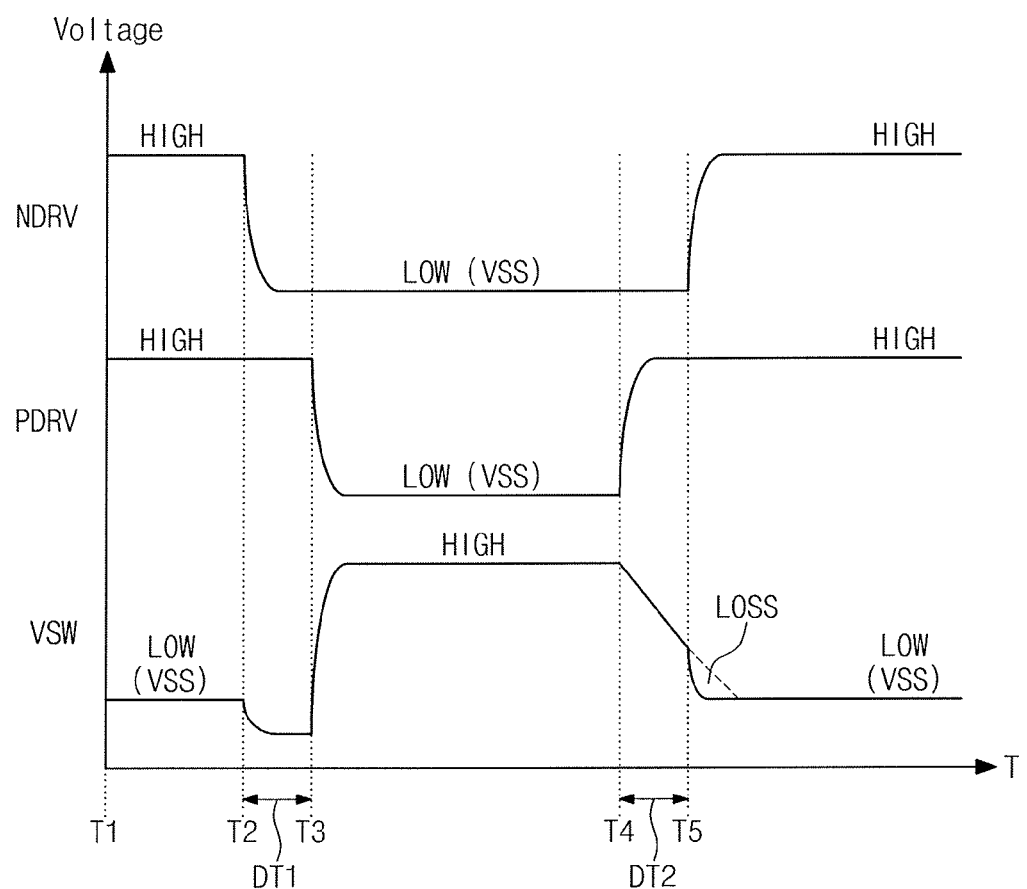
FIG. 3 shows variations of a first control signal, a second control signal, and a switch voltage when a second dead time is reduced, according to an exemplary embodiment of the present inventive concept.

FIG. 3 shows variations of a first control signal PDRV, a second control signal NDRV, and a switch voltage VSW when a second dead time DT2 is reduced, according to an exemplary embodiment of the present inventive concept. In FIG. 3, the abscissa represents a time T, and the ordinate represents voltage levels of signals.

Compared to FIG. 2, at T5 in FIG. 3, the second switch 120 is activated before a switch voltage VSW is fully discharged. If the second switch 120 is activated, the switch voltage VSW may be discharged through a ground node while the switch voltage VSW is not supplied to the load. For example, when the second switch 120 is turned on before the switch voltage VSW is discharged, power loss occurs. Thus, the second dead time DT2 may be increased to reduce power loss due to the turned-on second transistor 120.

As described above, a first dead time DT1 and the second dead time DT2 may increase stability of a voltage converter 100 and may lower conversion efficiency thereof. The voltage converter 100 according to an exemplary embodiment of the present inventive concept controls the first dead time DT1 and the second dead time DT2 such that the stability and the conversion efficiency thereof are optimized.

Figure 4:
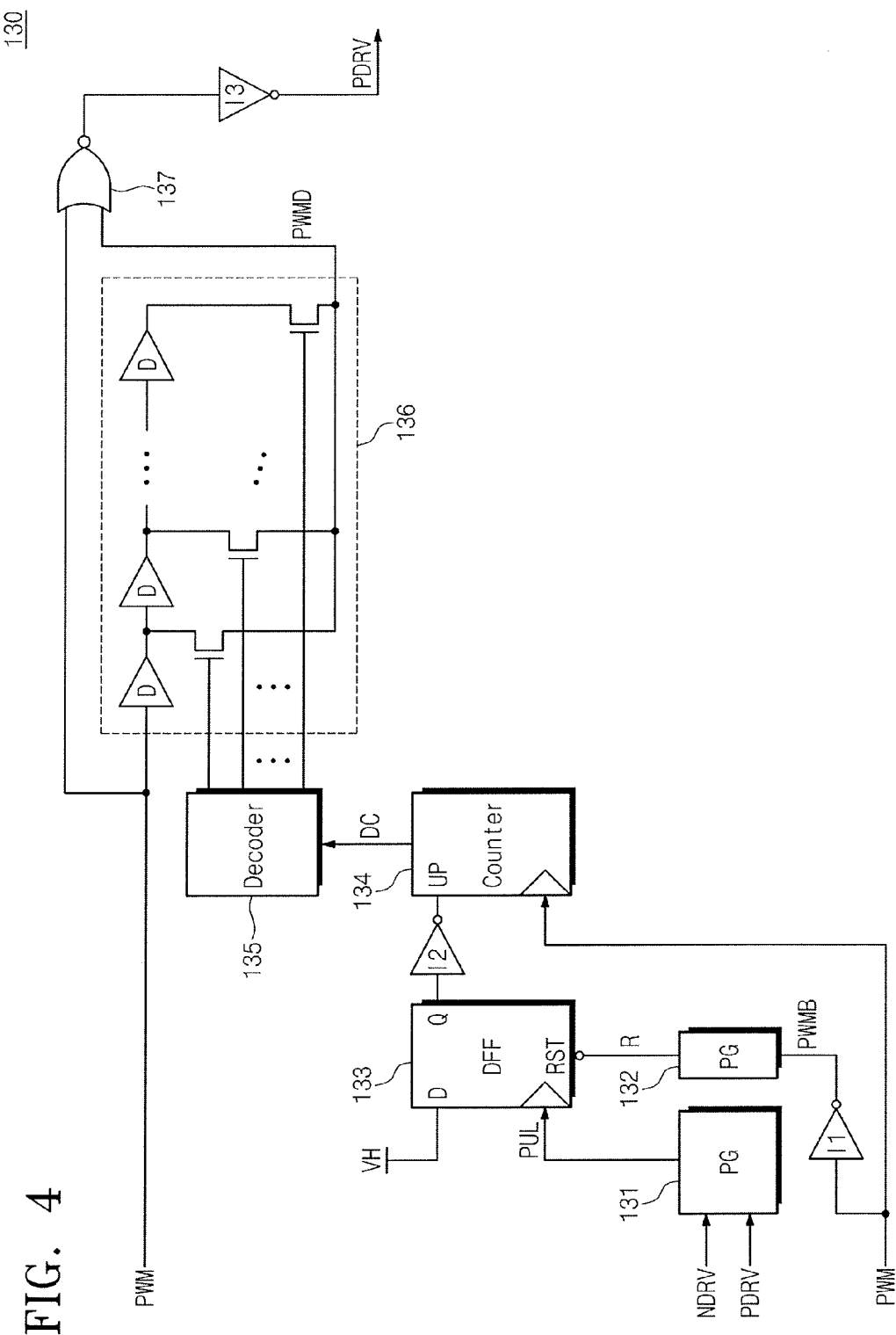
FIG. 4 is a diagram of a first switch controller according to an exemplary embodiment of the present inventive concept.

FIG. 4 is a diagram of a first switch controller 130 according to an exemplary embodiment of the present inventive concept. Referring to FIGS. 1 and 4, a first switch controller 130 includes a first pulse generator 131, a second pulse generator 132, a D-type flip-flop 133, a counter 134, a decoder 135, a delay unit 136, a logic gate 137, and inverters 11, 12, and 13.

The first pulse generator 131 receives the first control signal PDRV and the second control signal NDRV. The first pulse generator 131 outputs a pulse signal PUL in response to the first and second control signals PDRV and NDRV. For example, when the first control signal PDRV is activated upon inactivation of the second control signal NDRV (e.g., when the first control signal PDRV is activated and the second control signal NDRV is deactivated concurrently), the first pulse generator 131 outputs the pulse signal PUL that transitions to a high level (e.g., activation) and then transitions to a low level (e.g., inactivation). If the first control signal PDRV is activated after the second control signal NDRV is inactivated, the first pulse generator 131 outputs the pulse signal PUL that maintains a low level. The first pulse generator 131 compares levels of the first and second control signals PDRV and NDRV with each other at a particular timing (e.g., the timing when the second control signal NDRV is inactivated) in synchronization with the pulse width modulation signal PWM. The first pulse generator 131 generates the pulse signal PUL as the comparison result. The pulse signal PUL is applied to a clock input of the D-type flip-flop 133.

The first inverter 11 receives the pulse width modulation signal PWM to output an inverted pulse signal PWMB. The inverted pulse signal PWMB is applied to the second pulse generator 132.

The second pulse generator 132 receives the inverted pulse signal PWMB. The second pulse generator 132 outputs a reset signal R in synchronization with the inverted pulse signal PWMB. The reset signal R periodically transitions from a high level (e.g., activation) to a low level (e.g., inactivation) or from the low level to the high level in synchronization with a particular timing of the inverted pulse signal PWMB. The reset signal R is applied to a reset input RST of the D-type flip-flop 133.

The D-type flip-flop 133 operates in response to the pulse signal PUL and the reset signal R. The pulse signal PUL is applied to the clock input of the D-type flip-flop 133. The reset signal R is applied to the reset input RST of the D-type flip-flop 133. A high voltage VH is applied to an input D of the D-type flip-flop 133. For example, the high voltage VH may be an input voltage VIN. The D-type flip-flop 133 is periodically reset in response to the reset signal R that is periodically activated. For example, an output Q of the D-type flip-flop 133 is periodically reset with a low level. The output Q of the D-type flip-flop 133 transitions to a high level when the pulse signal PUL is activated. The output Q of the D-type flip-flop 133 is connected to the counter 134 through the second inverter 12.

The counter 134 operates in response to the pulse width modulation signal PWM and an output of the second inverter 12. The counter 134 periodically adjusts a delay count DC in synchronization with the pulse width modulation signal PWM. For example, when a voltage of an input node UP connected with the second inverter 12 has a high level, the counter 134 decreases the delay count DC. When the voltage of the input node UP has a low level, the counter 134 increases the delay count DC. The delay count DC is provided to the decoder 135.

The decoder 135 selects an amount of delay of the delay unit 136 in response to the delay count DC. The decoder 135 activates a first line of a plurality of lines connected to the delay unit 136 and inactivates the remaining lines of the plurality of lines other than the activated first line.

The delay unit 136 delays the pulse width modulation signal PWM in response to a control of the decoder 135 to output a delay signal PWMD. The delay unit 136 includes a plurality of delays D and a plurality of switches SW. The delays D are connected in series. The switches SW are connected to outputs of the delays D, respectively. One of the switches SW is activated by the decoder 135. At this time, the remaining switches of the switches SW are inactivated by the decoder 135. For example, the switches SW select one of the outputs of the delays D as the delay signal PWMD.

In an exemplary embodiment of the present inventive concept, the greater the delay count DC, the greater the amount of delay of the pulse width modulation signal PWM. For example, as the delay count DC increases, the amount of delay between the pulse width modulation signal PWM and the delay signal PWMD increases. The smaller the delay count DC, the smaller the amount of delay of the pulse width modulation signal PWM. For example, as the delay count DC decreases, the amount of delay between the pulse width modulation signal PWM and the delay signal PWMD decreases.

The logic gate 137 receives the pulse width modulation signal PWM and the delay signal PWMD. The logic gate 137 outputs a logical NOR result between the pulse width modulation signal PWM and the delay signal PWMD. An output of the logic gate 137 is output to the third inverter 13. The third inverter 13 inverts the output of the logic gate 137 and outputs the first control signal PDRV.

The first control signal PDRV depends on a logical NOR result between the pulse width modulation signal PWM and the delay signal PWMD. When the pulse width modulation signal PWM and the delay signal PWMD have low levels, the first control signal PDRV has a low level, (e.g., activated). When at least one of the pulse width modulation signal PWM and the delay signal PWMD has a high level, the first control signal PDRV has a high level (e.g., inactivated).

Figure 5:
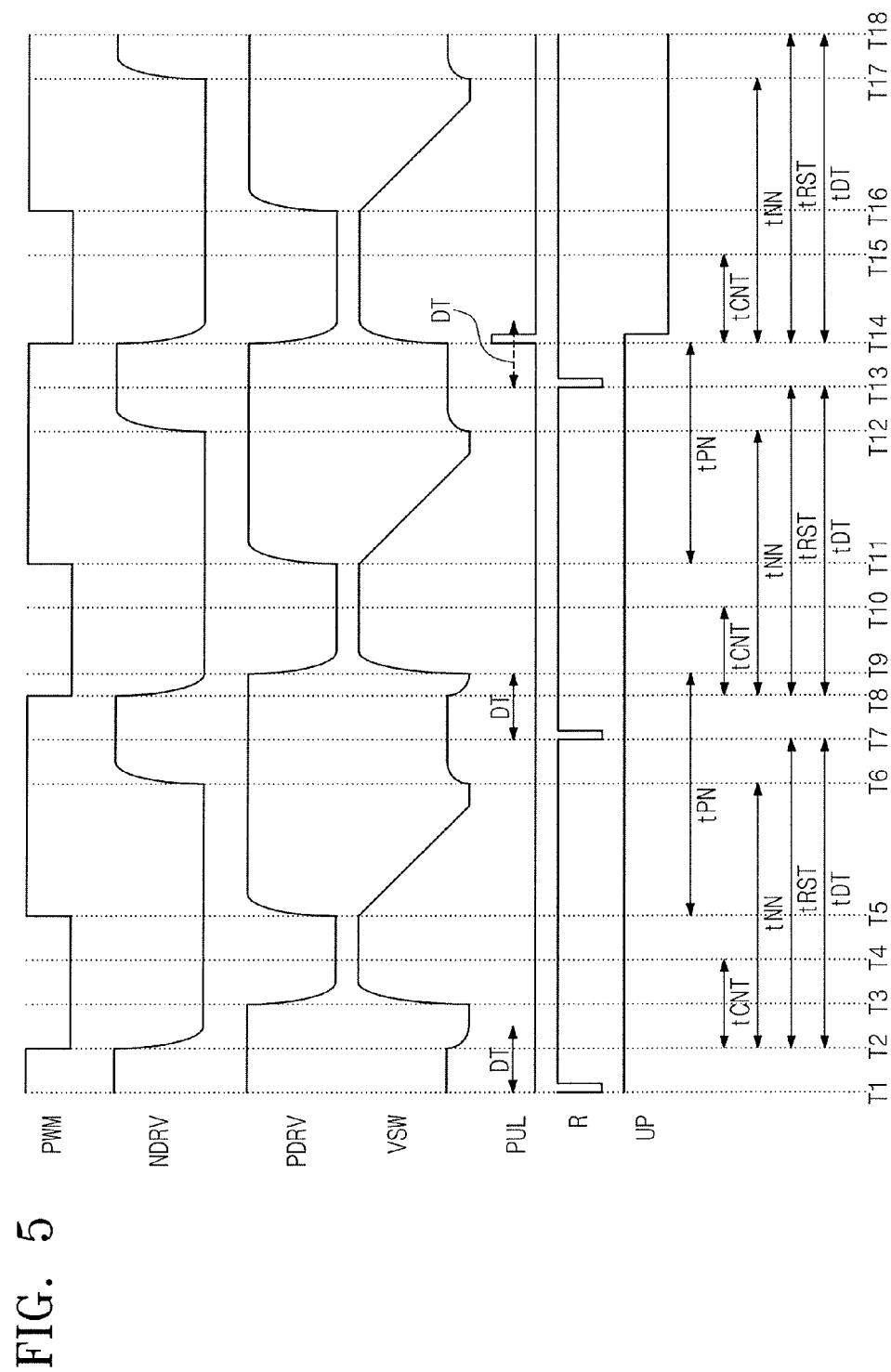
FIGS. 5 and 6 show waveforms of internal signals of a first switch controller and signals associated with the first switch controller according to an exemplary embodiment of the present inventive concept.
Figure 6:
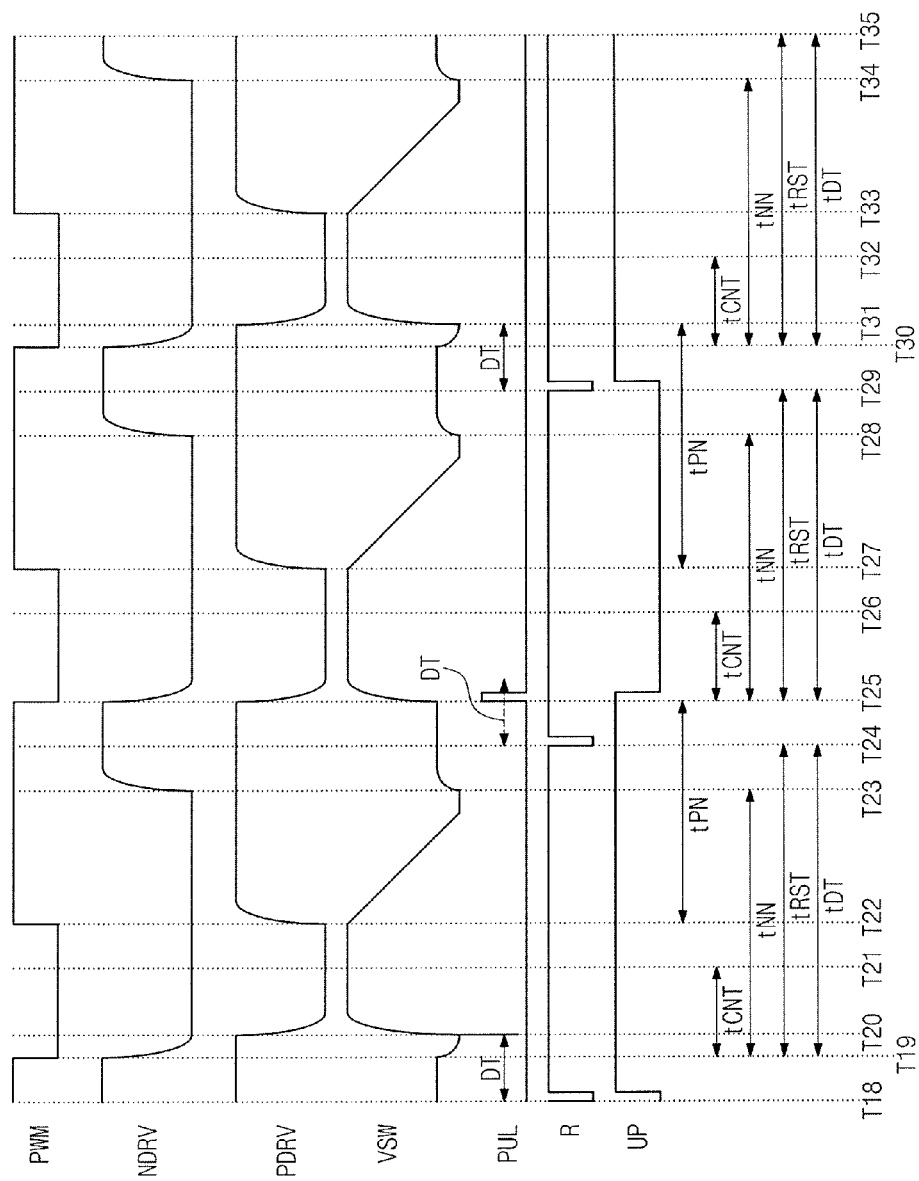

FIGS. 5 and 6 show waveforms of internal signals of a first switch controller 130 and signals associated with the first switch controller 130 according to an exemplary embodiment of the present inventive concept. Referring to FIGS. 1 and 4 through 6, at T1, a pulse width modulation signal PWM has a high level, a second control signal NDRV has a high level (e.g., activated), a first control signal PDRV has a high level (e.g., inactivated), a switch voltage VSW of the switch node SW is the ground voltage VSS because the second control signal NDRV is activated, a reset signal R is activated, and a voltage of the input node UP of the counter 134 has a high level.

At T2, the pulse width modulation signal PWM transitions to a low level. The second control signal NDRV is inactivated to a low level when the pulse width modulation signal PWM transitions to a low level. The switch voltage VSW falls to a level lower than the ground voltage VSS.

At T3, the first control signal PDRV is activated. When the first control signal PDRV is activated, the switch voltage VSW rises to a high level.

At T4, the counter 134 adjusts the delay count DC in synchronization with the pulse width modulation signal PWM. For example, the counter 134 adjusts the delay count DC when a count time tCNT elapses from a falling edge (e.g., T2) of the pulse width modulation signal PWM. In this case, the counter 134 decreases the delay count DC because the voltage of the input node UP has a high level.

As the delay count DC decreases, an amount of delay of the delay signal PWMD from the pulse width modulation signal PWM decreases. For example, the timing when the delay signal PWMD transitions to a low level is advanced (e.g., quickened or shortened) and thus, the timing when the first control signal PDRV is activated is advanced. Thus, a first time tPN between a rising edge (e.g., T5) of the pulse width modulation signal PWM and the timing (e.g., T9) when the first control signal PDRV is activated may be reduced. The reduced first time tPN is applied to a next period of the pulse width modulation signal PWM.

At T5, the pulse width modulation signal PWM transitions to a high level and thus, the first control signal PDRV is inactivated to a high level. The switch voltage VSW decreases from the high level to be lower than the ground voltage VSS.

At T6, the second control signal NDRV is activated to a high level. The second control signal NDRV is activated when a second time tNN elapses from the falling edge (e.g., T2) of the pulse width modulation signal PWM. The switch voltage VSW goes to the ground voltage VSS when the second control signal NDRV is activated.

At T7 when a reset time tRST elapses from the falling edge (e.g., T2) of the pulse width modulation signal PWM, the reset signal R is activated and the voltage of the input node UP of the counter 134 has a high level.

At T7, a detection period DT starts. For example, during the detection period DT, the first pulse generator 131 compares the first control signal PDRV with the second control signal NDRV and generates a pulse signal PUL as the comparison result. The detection period DT starts when a detection time tDT elapses from the falling edge (e.g., T2) of the pulse width modulation signal PWM. In the detection period DT, the first control signal PDRV is activated after the second control signal NDRV is inactivated. Accordingly, the pulse signal PUL maintains a low level.

At T8, the pulse width modulation signal PWM transitions to a low level, and the second control signal NDRV is inactivated to a low level.

At T9, the first control signal PDRV is activated to a low level. For example, the first control signal PDRV is activated when the first time tPN elapses after the pulse width modulation signal PWM transitions to a high level.

At T10 when the count time tCNT elapses from T8, the counter 134 adjusts the delay count DC. In this case, the counter 134 decreases the delay count DC because the voltage of the input node UP has a high level, and thus the first time tPN is shortened.

At T11, the pulse width modulation signal PWM transitions to a high level. The first control signal PDRV is inactivated to a high level. At T12 when the second time tNN elapses from T8, the second control signal NDRV is activated to a high level.

At T13 when the reset time tRST elapses from T8, the reset signal R is activated and the voltage of the input node UP has a high level. The detection period DT starts from T13 when the detection time tDT elapses from T8. At T14 of the detection period DT, the pulse signal PUL is activated to a high level and then inactivated to a low level because the first control signal PDRV is activated when the second control signal NDRV is inactivated. The voltage of the input node UP of the counter 134 transitions to a low level in response to the activation of the pulse signal PUL. At T14 when the first time tPN elapses from T11, the first control signal PDRV is activated. The first time tPN between T11 and T14 is shorter than that between T5 and T9.

At T14, the pulse width modulation signal PWM transitions to a low level. At T15 when the count time tCNT elapses from T14, the counter 134 adjusts the delay count DC. In this case, the counter 134 increases the delay count DC because the voltage of the input node UP has a low level. The increased first time tPN is applied to a next period of the pulse width modulation signal PWM.

At T16, the pulse width modulation signal PWM transitions to a high level. At T17 when the second time tNN elapses from T14, the second control signal NDRV is activated to a high level. At T18 when the reset time tRST elapses from T14, the reset signal R is activated. The input node UP of the counter 134 transitions to a high level in response to the activation of the reset signal R. The detection period DT starts from T18 when the detection time tDT elapses from T14.

At T19, the pulse width modulation signal PWM transitions to a low level. At T20, the first control signal PDRV is activated to a low level. At T21 when the count time tCNT elapses from T19, the counter 134 adjusts the delay count DC. In this case, the counter 134 decreases the delay count DC because the voltage of the input node UP has a high level. At T22, the pulse width modulation signal PWM transitions to a high level. At T23 when the second time tNN elapses from T19, the second control signal NDRV is activated to a high level. At T24 when the reset time tRST elapses from T19, the reset signal R is activated and the voltage of the input node UP has a high level. The detection period DT starts from T24 when the detection time tDT elapses from T19. At T25 of the detection period DT, the pulse signal PUL is activated because the first control signal PDRV is activated when the second control signal NDRV is inactivated. The voltage of the input node UP of the counter 134 transitions to a low level in response to the activation of the pulse signal PUL. At T25 when the first time tPN elapses from T22, the first control signal PDRV is activated.

At T25, the pulse width modulation signal PWM transitions to a low level. At T26 when the count time tCNT elapses from T25, the counter 134 adjusts the delay count DC. In this case, the counter 134 increases the delay count DC because the voltage of the input node UP has a low level. At T27, the pulse width modulation signal PWM transitions to a high level. At T28 when the second time tNN elapses from T25, the second control signal NDRV is activated to a high level. At T29 when the reset time tRST elapses from T25, the reset signal R is activated. The voltage of the input node UP transitions to a high level in response to the activation of the reset signal R. The detection period DT starts from T29 when the detection time tDT elapses from T25. In the detection period DT, the pulse signal PUL maintains a low level and the voltage of the input node UP maintains a high level. The reason is that the first control signal PDRV is activated when the second control signal NDRV is inactivated.

At T30, the pulse width modulation signal PWM transitions to a low level. At T31 when the first time tPN elapses from T27, the first control signal PDRV is activated to a low level. At T32 when the count time tCNT elapses from T30, the counter 134 adjusts the delay count DC. In this case, the counter 134 decreases the delay count DC because the voltage of the input node UP has a high level. At T33, the pulse width modulation signal PWM transitions to a high level. At T34 when the second time tNN elapses from T30, the second control signal NDRV is activated to a high level. At T35 when the reset time tRST elapses from T30, the reset signal R is activated and the voltage of the input node UP has a high level. The detection period DT starts from T35 when the detection time tDT elapses from T30.

As described above, when the first control signal PDRV is activated after the second control signal NDRV is inactivated, the first switch controller 130 advances (e.g., quickens or shortens) the timing when the first control signal PDRV is activated. When the first control signal PDRV is activated upon the inactivation of the second control signal NDRV, the first switch controller 130 delays the timing when the first control signal PDRV is activated. Accordingly, the first switch controller 130 prevents an input node, supplied with an input voltage VIN, from being short-circuited with a ground node and minimizes a first dead time DT1. Thus, the voltage converter 100 according to an exemplary embodiment of the present inventive concept may increase stability and conversion efficiency thereof.

FIGS. 5 and 6 illustrate that timings of signals are synchronized with the pulse width modulation signal PWM. However, the present inventive concept is not limited thereto.

Figure 7:
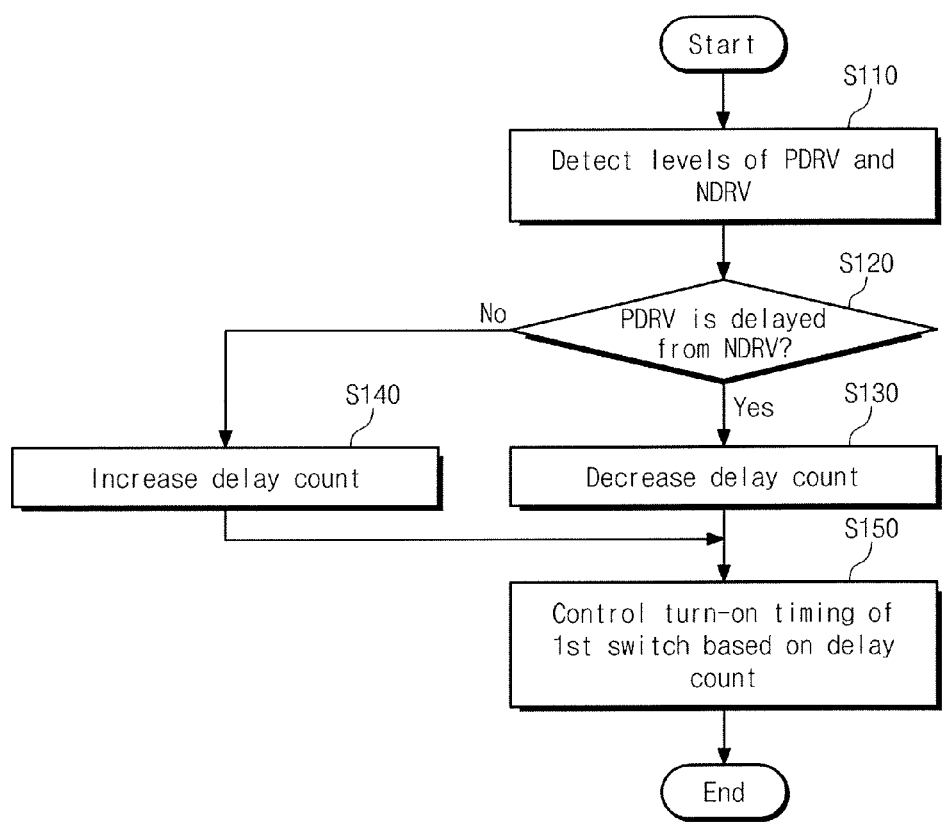
FIG. 7 is a flow chart showing an operating method of a voltage converter according to an exemplary embodiment of the present inventive concept.

FIG. 7 is a flow chart showing an operating method of a voltage converter 100 according to an exemplary embodiment of the present inventive concept. Referring to FIGS. 1 and 7, in a step S110, levels of the first and second control signals PDRV and NDRV are detected. For example, levels of the first and second control signals PDRV and NDRV are detected when the second control signal NDRV is inactivated.

In a step S120, whether the timing when the first control signal PDRV is activated is delayed from the timing when the second control signal NDRV is inactivated is determined. If the activation timing of the first control signal PDRV is delayed from the inactivation timing of the second control signal NDRV, the delay count DC is decreased in a step S130. If the activation timing of the first control signal PDRV is not delayed from the inactivation timing of the second control signal NDRV, the delay count DC is increased in a step S140.

In a step S150, a turn-on timing of the first switch 110 is adjusted based on the delay count DC which is adjusted in the step S130 or S140. For example, the turn-on timing of the first switch 110 may be delayed when the delay count DC is increased and the turn-on timing of the first switch 110 may be advanced when the delay count DC is decreased.

Figure 8:
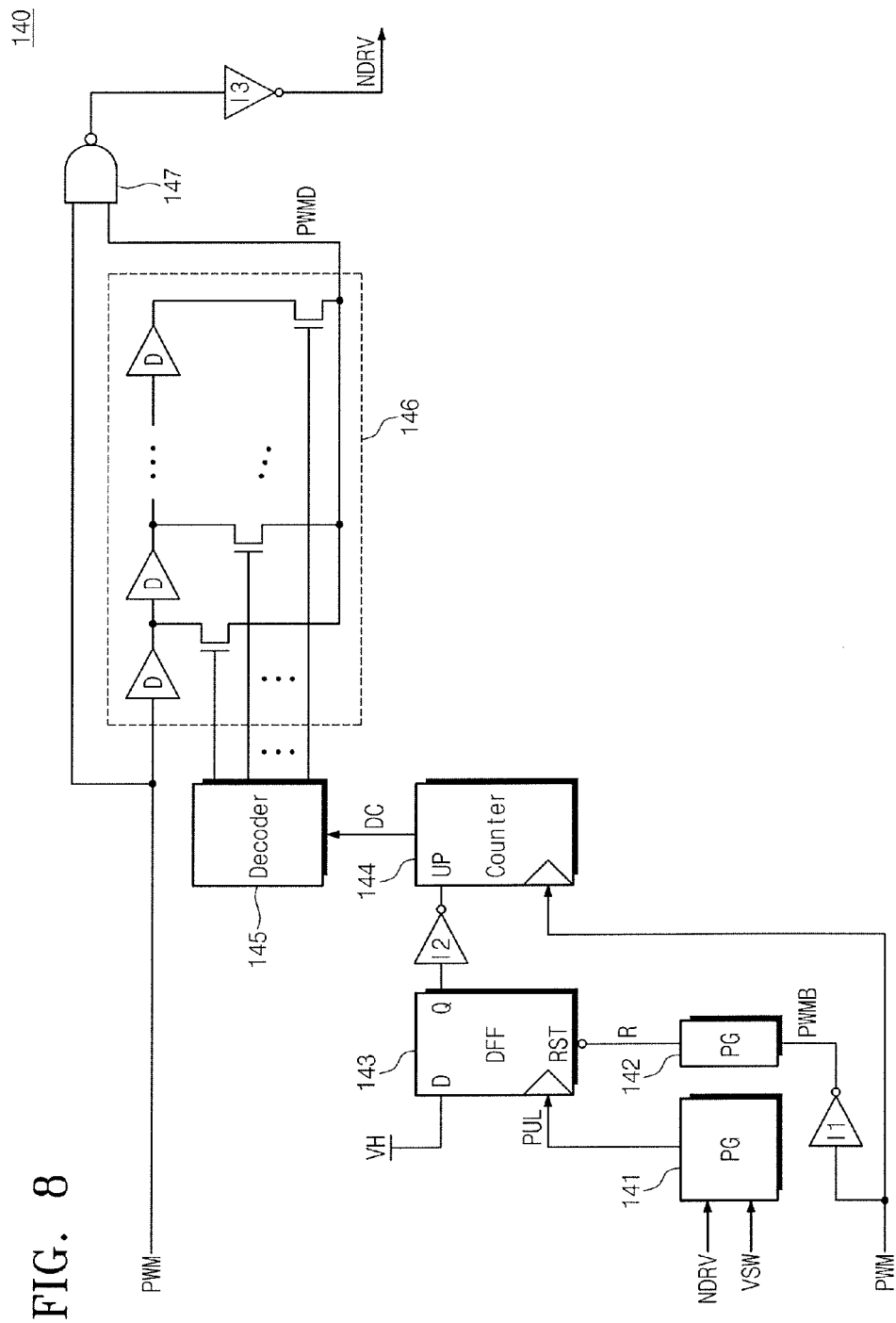
FIG. 8 is a diagram of a second switch controller according to an exemplary embodiment of the present inventive concept.

FIG. 8 is a diagram of a second switch controller 140 according to an exemplary embodiment of the present inventive concept. Referring to FIG. 8, a second switch controller 140 includes a first pulse generator 141, a second pulse generator 142, a D-type flip-flop 143, a counter 144, a decoder 145, a delay unit 146, a logic gate 147, and inverters 11, 12, and 13. The second switch controller 140 has substantially the same structure as the first switch controller 130 of FIG. 4 except a second control signal NDRV and a switch voltage VSW are supplied to the first pulse generator 141 and the logic gate 146 conducts a NAND operation. Thus, duplicated descriptions of the second switch controller 140 with the first switch controller 130 of FIG. 4 will be omitted.

The first pulse generator 141 receives the second control signal NDRV and the switch voltage VSW. When the switch voltage VSW is not lower than the ground voltage VSS upon activation of the second control signal NDRV, the first pulse generator 141 activates a pulse signal PUL to a high level and then inactivates the pulse signal PUL to a low level. When the switch voltage VSW is lower than the ground voltage VSS upon the activation of the second control signal NDRV, the first pulse generator 141 maintains the low level of the pulse signal PUL. The first pulse generator 141 compares a level of the second control signal NDRV with a level of the switch voltage VSW at a particular timing (e.g., the timing when the second control signal NDRV is inactivated) in synchronization with a pulse width modulation signal PWM. The first pulse generator 141 generates the pulse signal PUL as the comparison result.

The logic gate 147 receives the pulse width modulation signal PWM and a delay signal PWMD. The logic gate 147 outputs a logical NAND result between the pulse width modulation signal PWM and the delay signal PWMD. An output of the logic gate 147 is output to the third inverter 13. The third inverter 13 inverts the output of the logic gate 137 and outputs the second control signal NDRV.

The second control signal NDRV depends on a logical NAND result between the pulse width modulation signal PWM and the delay signal PWMD. When the pulse width modulation signal PWM and the delay signal PWMD have high levels, the second control signal NDRV is activated to a high level. When at least one of the pulse width modulation signal PWM and the delay signal PWMD has a low level, the second control signal NDRV is inactivated to a low level.

Figure 9:
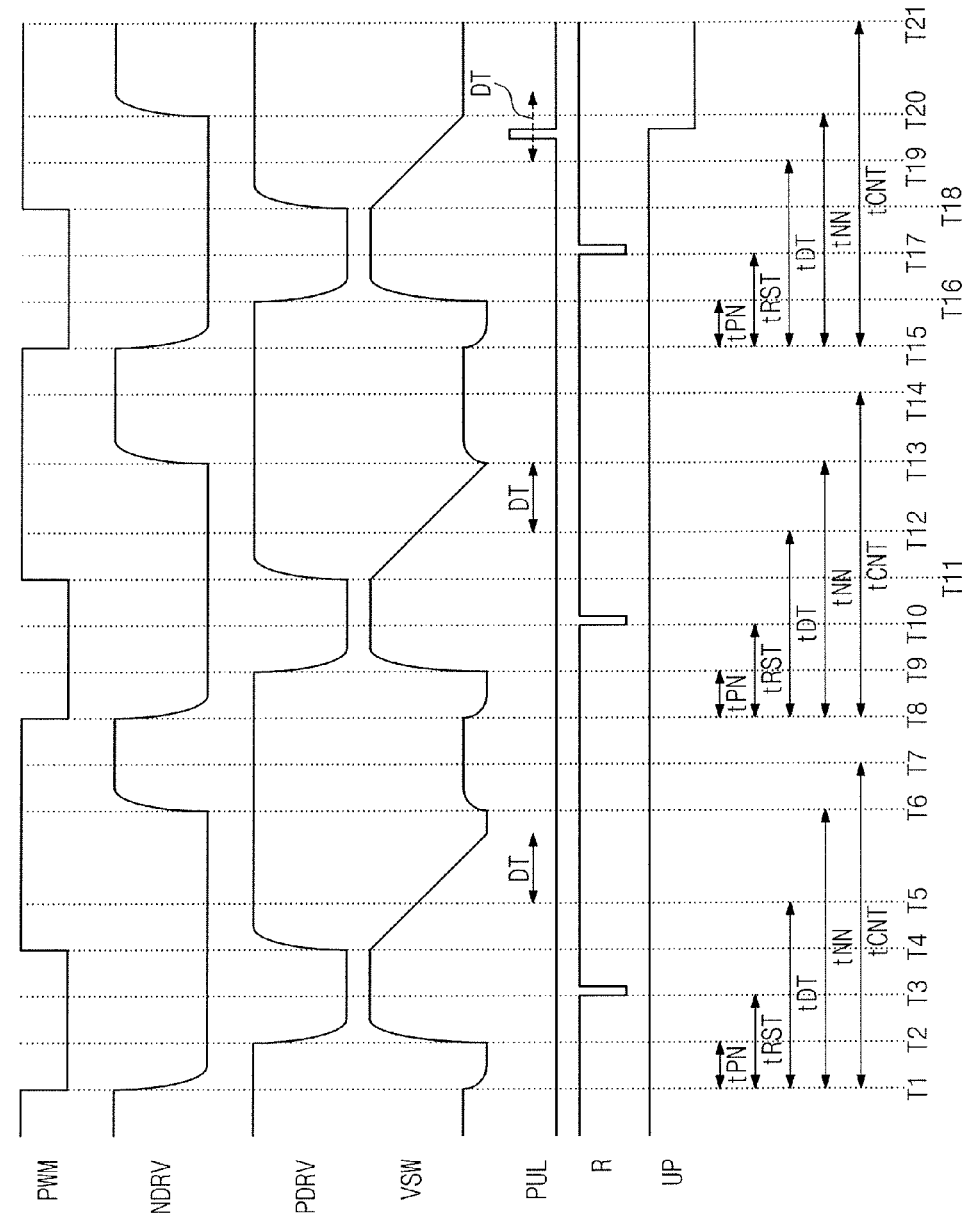
FIGS. 9 and 10 show waveforms of internal signals of a second switch controller and signals associated with the second switch controller according to an exemplary embodiment of the present inventive concept.
Figure 10:
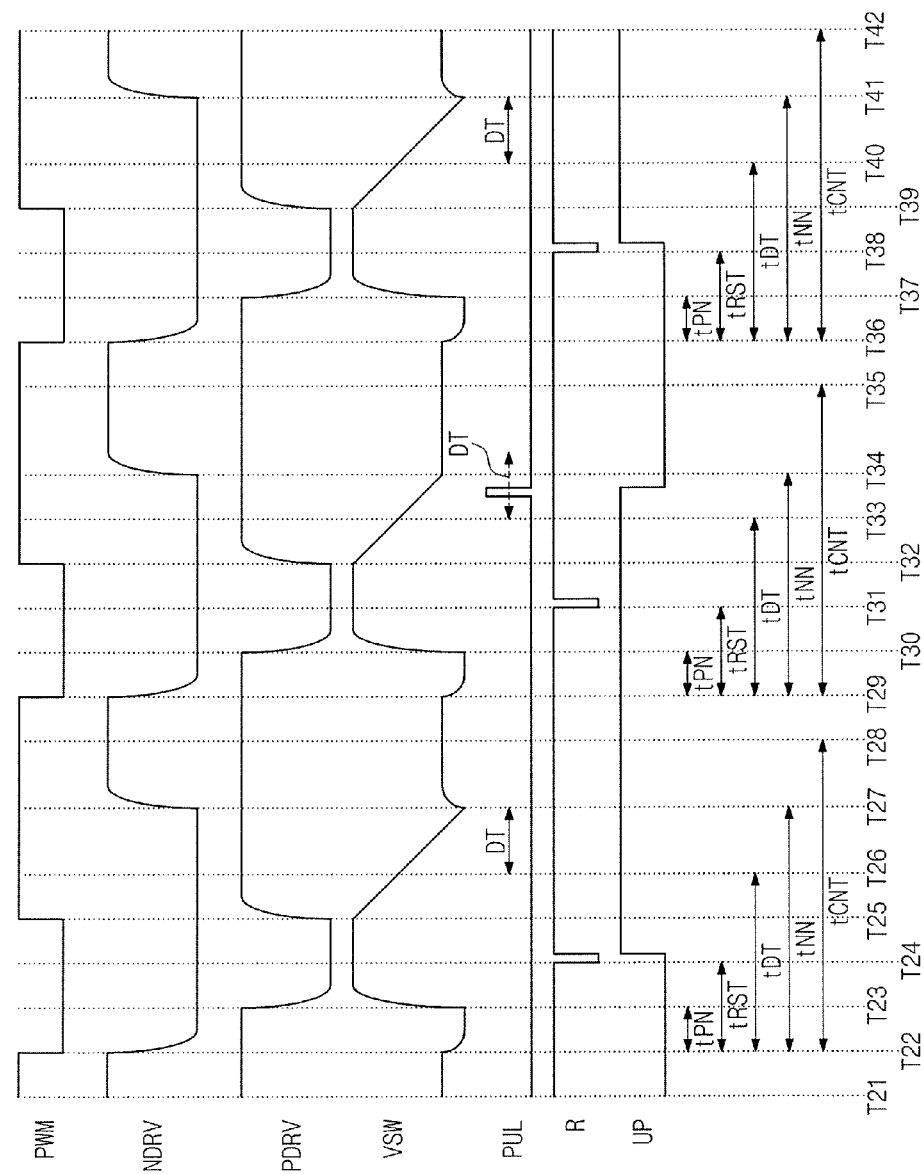

FIGS. 9 and 10 show waveforms of internal signals of a second switch controller 140 and signals associated with the second switch controller 140 according to an exemplary embodiment of the present inventive concept. Referring to FIGS. 1 and 8 through 10, at T1, a pulse width modulation signal PWM transitions to a low level. At this time, a second control signal NDRV is inactivated to a low level, and a switch voltage VSW becomes lower than the ground voltage VSS.

At T2 when a first time tPN elapses from T1, a first control signal PDRV is activated to a low level, and the switch voltage VSW rises to a high level. At T3 when a reset time tRST elapses from T1, a reset signal R is activated and a voltage of the input node UP of the counter 144 has a high level. At T4, the pulse width modulation signal PWM transitions to a high level, and the first control signal PDRV is inactivated to a high level. At T5 when a detection time tDT elapses from T1, the first pulse generator 141 compares a voltage level of the second control signal NDRV with a level of the switch voltage VSW and generates a pulse signal PUL as the comparison result. The pulse signal PUL maintains a low level because the switch voltage VSW becomes lower than the ground voltage VSS upon activation of the second control signal NDRV. At T6 when a second tNN elapses from T1, the second control signal NDRV is activated to a high level. At T7 when a count time tCNT elapses from T1, the counter 144 adjusts a delay count DC in response to the voltage level of the input node UP. In this case, the counter 144 decreases the delay count DC because the voltage of the input node UP has a high level, and thus, the second time tNN is shortened. The reduced delay count DC or the second time tNN is applied to a next period of the pulse width modulation signal PWM.

At T8, the pulse width modulation signal PWM transitions to a low level, and the second control signal NDRV is inactivated to a low level. At T9 when the first time tPN elapses from T8, the first control signal PDRV is activated to a low level. At T10 when the reset time tRST elapses from T8, the reset signal R is activated and the voltage of the input node UP of the counter 144 has a high level. At T11, the pulse width modulation signal PWM transitions to a high level, and the first control signal PDRV is inactivated to a high level. A detection period DT starts from T12 when the detection time tDT elapses from T8. The pulse signal PUL maintains a low level because the switch voltage VSW is lower than the ground voltage VSS upon activation of the second control signal NDRV (e.g., at T13). The second control signal NDRV is activated to a high level at T13 when the second tNN elapses from T8. At T14 when the count time tCNT elapses from T8, the delay count DC is adjusted. In this case, the delay count DC is decreased because the voltage of the input node UP has a high level, and thus, the second time tNN is shortened. The delay count DC or the second time tNN, which is adjusted, is applied to a next period of the pulse width modulation signal PWM.

At T15, the pulse width modulation signal PWM transitions to a low level, and the second control signal NDRV is inactivated to a low level. At T16 when the first time tPN elapses from T15, the first control signal PDRV is activated to a low level. At T17 when the reset time tRST elapses from T15, the reset signal R is activated and the voltage of the input node UP of the counter 144 has a high level. At T18, the pulse width modulation signal PWM transitions to a high level, and the first control signal PDRV is inactivated to a high level. The detection period DT starts from T19 when the detection time tDT elapses from T15. During the detection period DT, the pulse signal PUL is activated because the switch voltage VSW is not lower than the ground voltage VSS upon activation of the second control signal NDRV. The voltage of the input node UP of the counter 144 transitions to a low level in response to the activation of the pulse signal PUL. The second control signal NDRV is activated to a high level at T20 when the second time tNN elapses from T15. The delay count DC is adjusted at T21 when the count time tCNT elapses from T15. In this case, the delay count DC is increased because the voltage of the input node UP has a low level, and thus, the second time tNN is increased. The delay count DC or the second time tNN, which is adjusted, is applied to a next period of the pulse width modulation signal PWM.

At T22, the pulse width modulation signal PWM transitions to a low level, and the second control signal NDRV is inactivated to a low level. At T23 when the first time tPN elapses from T22, the first control signal PDRV is activated to a low level. The reset signal R is activated at T24 when the reset time tRST elapses from T22. The voltage of the input node UP of the counter 144 transitions to a high level in response to the activation of the reset signal R. At T25, the pulse width modulation signal PWM transitions to a high level, and the first control signal PDRV is inactivated to a high level. The detection period DT starts from T26 when the detection time tDT elapses from T22. The pulse signal PUL maintains a low level because the switch voltage VSW is lower than the ground voltage VSS upon activation of the second control signal NDRV (e.g., at T27). The second control signal NDRV is activated at T27 when the second time tNN elapses from T22. The delay count DC is adjusted at T28 when the count time tCNT elapses from T22. In this case, the delay count DC is decreased because the voltage of the input node UP has a high level, and thus, the second time tNN is decreased. The delay count DC or the second time tNN, which is adjusted, is applied to a next period of the pulse width modulation signal PWM.

At T29, the pulse width modulation signal PWM transitions to a low level, and the second control signal NDRV is inactivated to a low level. At T30 when the first time tPN elapses from T29, the first control signal PDRV is activated to a low level. At T31 when the reset time tRST elapses from T29, the reset signal R is activated and the voltage of the input node UP of the counter 144 has a high level. At T32, the pulse width modulation signal PWM transitions to a high level, and the first control signal PDRV is inactivated to a high level. The detection period DT starts from T33 when the detection time tDT elapses from T29. During the detection period DT, the pulse signal PUL is activated because the switch voltage VSW is not lower than the ground voltage VSS upon activation of the second control signal NDRV (e.g., at T34). The voltage of the input node UP of the counter 144 transitions to a low level in response to the activation of the pulse signal PUL. The second control signal NDRV is activated to a high level at T34 when the second time tNN elapses from T29. The delay count DC is adjusted at T35 when the count time tCNT elapses from T29. In this case, the delay count DC is increased because the voltage of the input node UP has a low level, and thus, the second time tNN is increased. The delay count DC or the second time tNN, which is adjusted, is applied to a next period of the pulse width modulation signal PWM.

At T36, the pulse width modulation signal PWM transitions to a low level, and the second control signal NDRV is inactivated to a low level. At T37 when the first time tPN elapses from T36, the first control signal PDRV is activated to a low level. The reset signal R is activated at T38 when the reset time tRST elapses from T36. The voltage of the input node UP of the counter 144 transitions to a high level in response to the activation of the reset signal R. At T39, the pulse width modulation signal PWM transitions to a high level, and the first control signal PDRV is inactivated to a high level. The detection period DT starts from T40 when the detection time tDT elapses from T36. The pulse signal PUL maintains a low level because the switch voltage VSW is lower than the ground voltage VSS upon activation of the second control signal NDRV (e.g., at T41). The second control signal NDRV is activated at T41 when the second time tNN elapses from T36. The delay count DC is adjusted at T42 when the count time tCNT elapses from T36. In this case, the delay count DC is decreased because the voltage of the input node UP has a high level, and thus, the second time tNN is decreased. The delay count DC or the second time tNN, which is adjusted, is applied to a next period of the pulse width modulation signal PWM.

As described above, when the switch voltage VSW is lower than the ground voltage VSS after the activation of the second control signal NDRV, the second switch controller 140 advances the timing when the second control signal PDRV is activated. When the switch voltage VSW is not lower than the ground voltage VSS after the activation of the second control signal NDRV, the second switch controller 140 delays the timing when the second control signal PDRV is activated. Accordingly, the second switch controller 140 connects the switch node SW to the ground node after a power charged in the switch node SW is consumed by a load and minimizes a second dead time DT2. Thus, the voltage converter 100 according to an exemplary embodiment of the present inventive concept may increase stability and conversion efficiency thereof.

For example, when the amount of power consumed by the load varies, a slope along which the switch voltage VSW decreases from a high level varies. The second switch controller 140 according to an exemplary embodiment of the present inventive concept may follow an optimal turn-on timing of the second switch 120 even if the slope along which the switch voltage VSW decreases from a high level varies. Thus, conversion efficiency of the voltage converter 100 is further improved.

FIGS. 9 and 10 illustrate that timings of signals are synchronized with the pulse width modulation signal PWM. However, the present inventive concept is not limited thereto.

Figure 11:
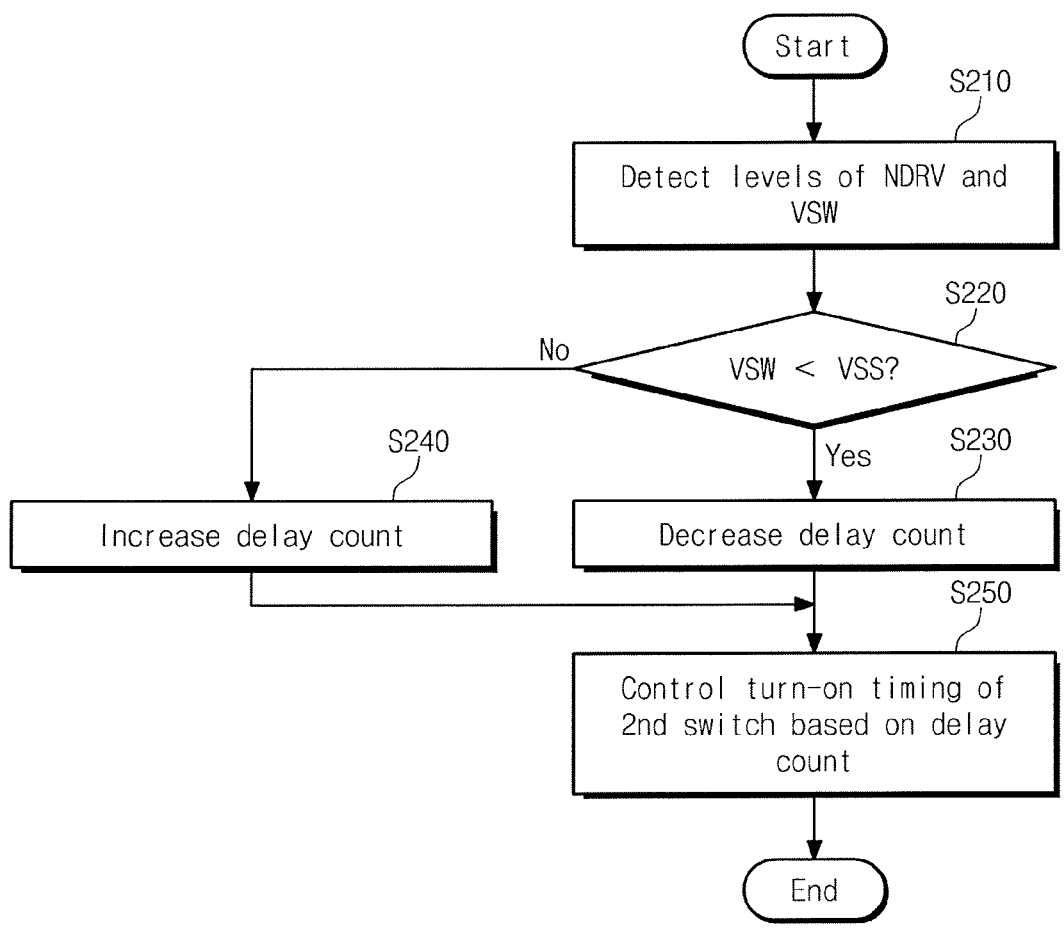
FIG. 11 is a flow chart showing an operating method of a voltage converter according to an exemplary embodiment of the present inventive concept.

FIG. 11 is a flow chart showing an operating method of a voltage converter 100 according to an exemplary embodiment of the present inventive concept. Referring to FIGS. 1 and 11, in a step S210, levels of the second control signal NDRV and the switch voltage VSW are detected. For example, levels of the second control signal NDRV and the switch voltage VSW are detected when the second control signal NDRV is activated.

In a step S120, whether the switch voltage VSW is lower than the ground voltage VSS is determined. If the switch voltage VSW is lower than the ground voltage VSS, a delay count DC is decreased in a step S230. If the switch voltage VSW is not lower than the ground voltage VSS, the delay count DC is increased in a step S240.

In a step S250, a turn-on timing of the second switch 120 is adjusted based on the delay count DC which is adjusted in the step S230 or S240. For example, the turn-on timing of the second switch 120 may be delayed when the delay count DC is increased and the turn-on timing of the second switch 120 may be advanced when the delay count DC is decreased.

Figure 12:
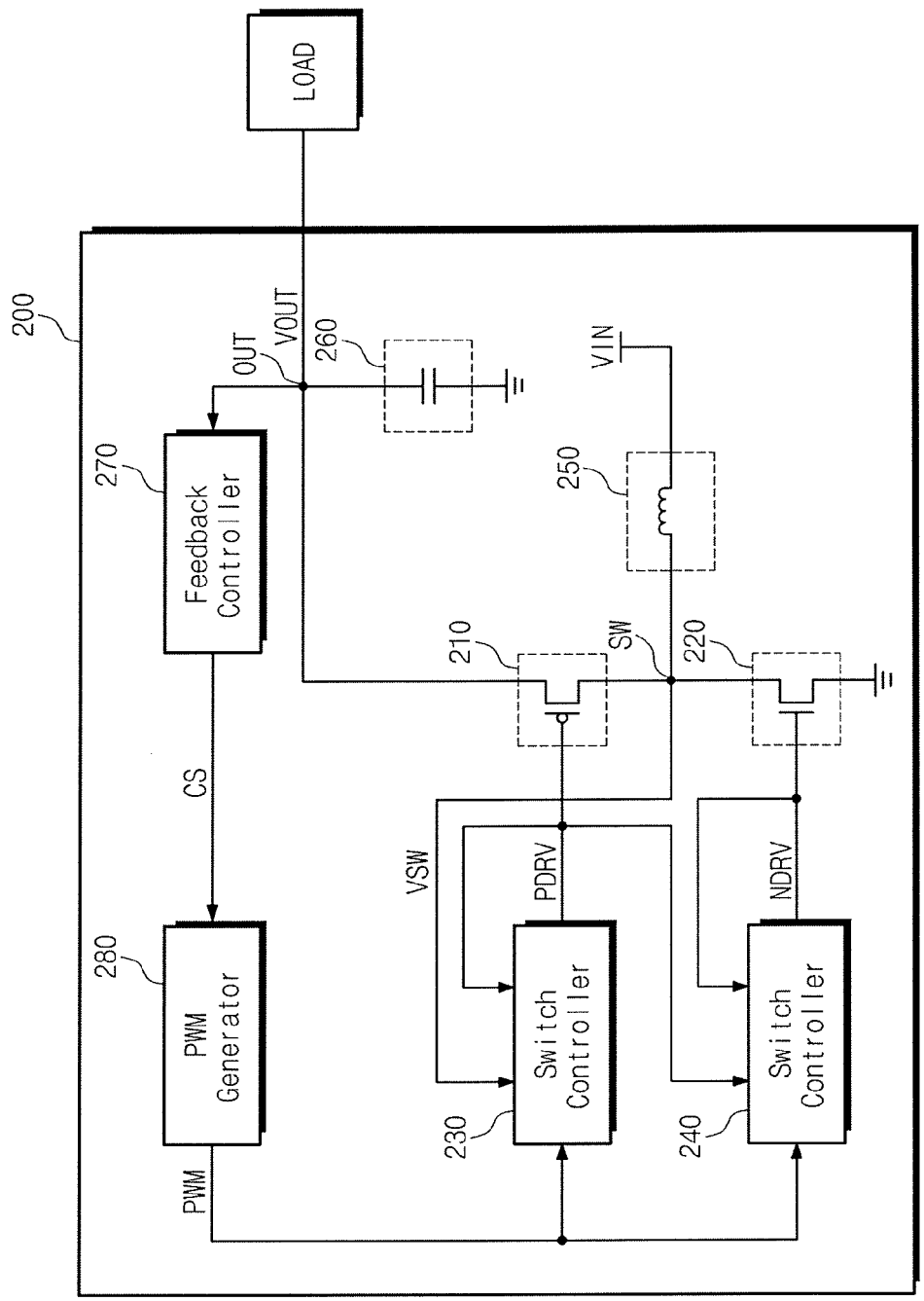
FIG. 12 is a diagram of a voltage converter according to an exemplary embodiment of the present inventive concept.

FIG. 12 is a diagram of a voltage converter 200 according to an exemplary embodiment of the present inventive concept. In an exemplary embodiment of the voltage converter 100, FIG. 12 illustrates a boost converter that generates an output voltage VOUT higher than an input voltage VIN. Referring to FIG. 12, the voltage converter 200 includes a first switch 210, a second switch 220, a first switch controller 230, a second switch controller 240, a first charging element 250, a second charging element 260, a feedback controller 270, and a pulse width modulation (PWM) signal generator 280.

The first switch 210 is connected between an output node, supplied with the output voltage VOUT, and a switch node SW. The first switch 210 operates in response to a first control signal PDRV output from the first switch controller 230. The first switch 110 may be formed of, but not limited to, a PMOS transistor.

The second switch 220 is connected between the switch node SW and a ground node. The second switch 220 operates in response to a second control signal NDRV output from the second switch controller 240. The second switch 220 may be formed of, but not limited to, an NMOS transistor.

The first switch controller 230 controls the first switch 110 to activate or inactivate the first control signal PDRV in response to a pulse width modulation signal PWM. The first switch controller 230 adjusts an activation timing of the first control signal PDRV in response to the pulse width modulation signal PWM, the first control signal PDRV, and a switch voltage of the switch node SW.

The second switch controller 240 controls the second switch 220 to activate and inactivate the second control signal NDRV in response to the pulse width modulation signal PWM. The second switch controller 240 adjusts an activation timing of the second control signal NDRV in response to the pulse width modulation signal PWM, the first control signal PDRV, and the second control signal NDRV.

The first charging element 250 is connected between the switch node SW and an input node supplied with an input voltage VIN. The first charging element 250 may be formed of, but not limited to, an inductor.

The second charging element 260 is connected between the output node OUT and the ground node. The second charging element 260 may be formed of, but not limited to, a capacitor.

The feedback controller 270 detects a level of the output voltage VOUT. The feedback controller 270 outputs a control signal CS, depending on whether a level of the output voltage VOUT is higher or lower than that of a target voltage. When a level of the output voltage VOUT is higher than that of the target voltage, the feedback controller 270 outputs the control signal CS to decrease the output voltage VOUT. When a level of the output voltage VOUT is lower than that of the target voltage, the feedback controller 270 outputs the control signal CS to increase the output voltage VOUT.

The pulse width modulation signal generator 280 generates the pulse width modulation signal PWM in response to the control signal CS. For example, when the control signal CS indicates to increase the output voltage VOUT, the pulse width modulation signal generator 280 may decrease (or increase) a pulse width of the pulse width modulation signal PWM. When the control signal CS indicates to decrease the output voltage VOUT, the pulse width modulation signal generator 180 may increase (or decrease) the pulse width of the pulse width modulation signal PWM.

In an exemplary embodiment of the present inventive concept, the first switch controller 230 may have substantially the same structure as the switch controller 130 of FIG. 4, except operations of the first pulse generator 131. For example, the first pulse generator 131 activates a pulse signal PUL when a switch voltage VSW at the switch node SW reaches the target level before activation of the first control signal PDRV. The first pulse generator 131 does not activate (e.g., maintains a low level of the pulse signal PUL) the pulse signal PUL when the switch voltage VSW does not reach the target level before the activation of the first control signal PDRV.

In an exemplary embodiment of the present inventive concept, the second switch controller 240 may have substantially the same structure as the switch controller 140 of FIG. 8, except operations of the first pulse generator 141. The first pulse generator 141 does not activate (e.g., maintains a low level of the pulse signal PUL) the pulse signal PUL when the activation timing of the second control signal NDRV is later than the inactivation timing of the first control signal PDRV. The first pulse generator 141 activates the pulse signal PUL when the activation timing of the second control signal NDRV is not later than the inactivation timing of the first control signal PDRV.

Figure 13:
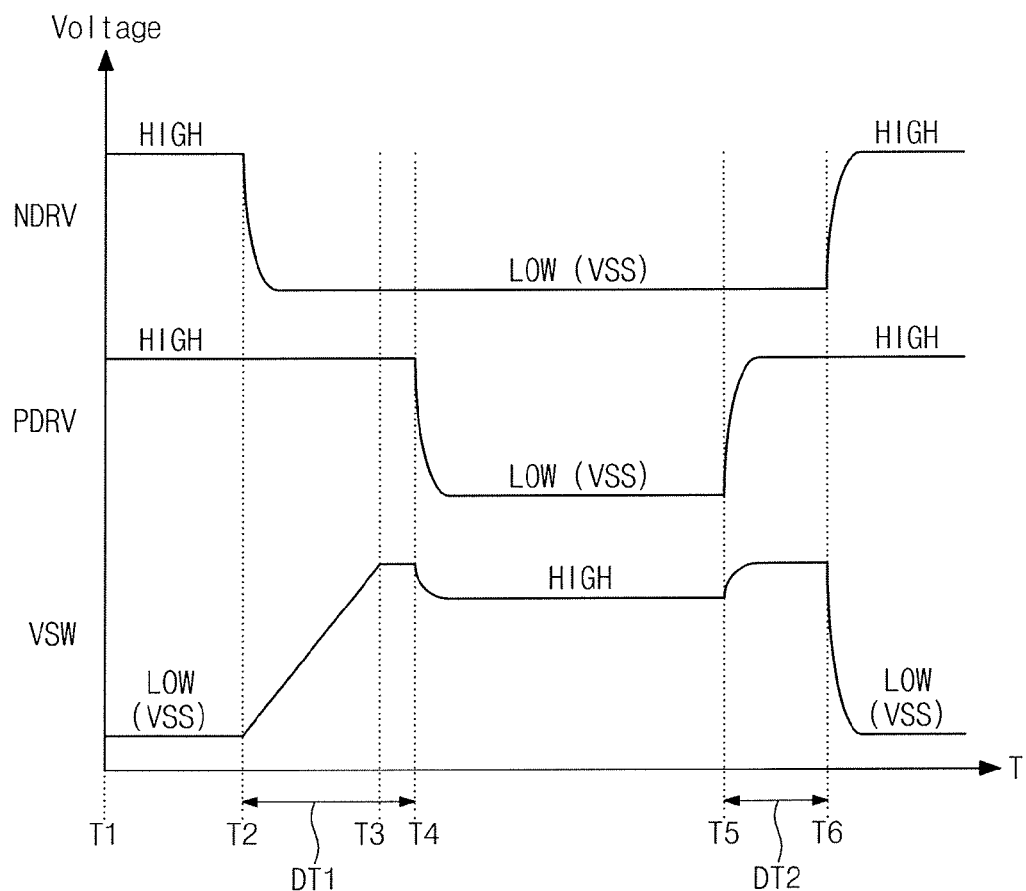
FIG. 13 shows variations of a first control signal, a second control signal, and a switch voltage of a voltage converter with the lapse of time, according to an exemplary embodiment of the present inventive concept.

FIG. 13 shows variations of a first control signal PDRV, a second control signal NDRV, and a switch voltage VSW of a voltage converter 200 with the lapse of time, according to an exemplary embodiment of the present inventive concept. In FIG. 13, the abscissa represents a time T, and the ordinate represents voltage levels of signals.

Referring to FIGS. 12 and 13, at T1, the first control signal PDRV and the second control signal NDRV have high levels. The high levels of the first and second control signals PDRV and NDRV correspond to a level of an input voltage VIN. The first switch 210 is turned off when the first control signal PDRV has a high level, and the second switch 220 is turned on when the second control signal NDRV has a high level. At T1, the switch voltage VSW has a low level (e.g., the ground voltage VSS) because a switch node SW is grounded through the second switch 120.

At T2, the second control signal NDRV transitions to a low level (e.g., the ground voltage VSS) and thus, the second switch 220 is turned off. In this case, the first switch 210 acts as a virtual diode which is connected between the switch node SW and the ground node. For example, a P-type junction of the first switch 210 connected with the switch node SW acts as an anode of the virtual diode and the P-type junction and an N-type body of the first switch 210, which are connected in common with the output node OUT, act as a cathode of the virtual diode.

A current path including a first charging element 250, the first switch 210, and a second charging element 260 is formed when the first switch 210 acts as the virtual diode. A voltage drop occurs due to the first switch 210 acting as the virtual diode, and thus, the switch voltage VSW of the switch node SW becomes higher than the output voltage VOUT of the output node OUT. For example, the switch voltage VSW may become higher than the output voltage VOUT of the output node OUT by a threshold voltage of the virtual diode.

At T3, the switch voltage VSW reaches a target level.

At T4, the first control signal PDRV transitions to a low level (e.g., the ground voltage VSS), and thus, the first switch 210 is turned on. At this time, the switch node SW is connected to the output node OUT through the first switch 210. The output voltage VOUT of the output node OUT becomes higher than the input voltage VIN due to a power charged in the first and second charge elements 250 and 260.

At T5, the first control signal PDRV transitions to a high level, and thus, the first switch 320 is turned off. When the first switch 210 and the second switch 220 are turned off (e.g., between T5 and T6), a current path including the virtual diode of the first switch 210, the first charging element 250, and the second charging element 260 is formed. Thus, the switch voltage VSW becomes higher than the output voltage VOUT.

At T6, the second control signal NDRV transitions to a high level, and thus, the second switch 220 is turned on. At this time, the switch node SW is grounded through the second switch 220 to have the ground voltage VSS.

As illustrated in FIG. 13, the first switch 210 and the second switch 220 may be alternately activated. For example, the second switch 220 is inactivated at T2, and the first switch 210 is activated at T3. The first switch 210 is inactivated at T4, and the second switch 220 is activated at T6.

A first dead time DT1 and a second dead time DT2 are provided to prevent the first and second switches 210 and 220 from being turned on at the same time. The first and second dead times DT1 and DT2 may be decreased to reduce power loss due to the virtual diode and the first dead time DT1 may be increased to have the switch node SW normally charged. The voltage converter 200 according to an exemplary embodiment of the present inventive concept adjusts the first and second dead times DT1 and DT2 such that stability and conversion efficiency thereof are optimized.

Figure 14:
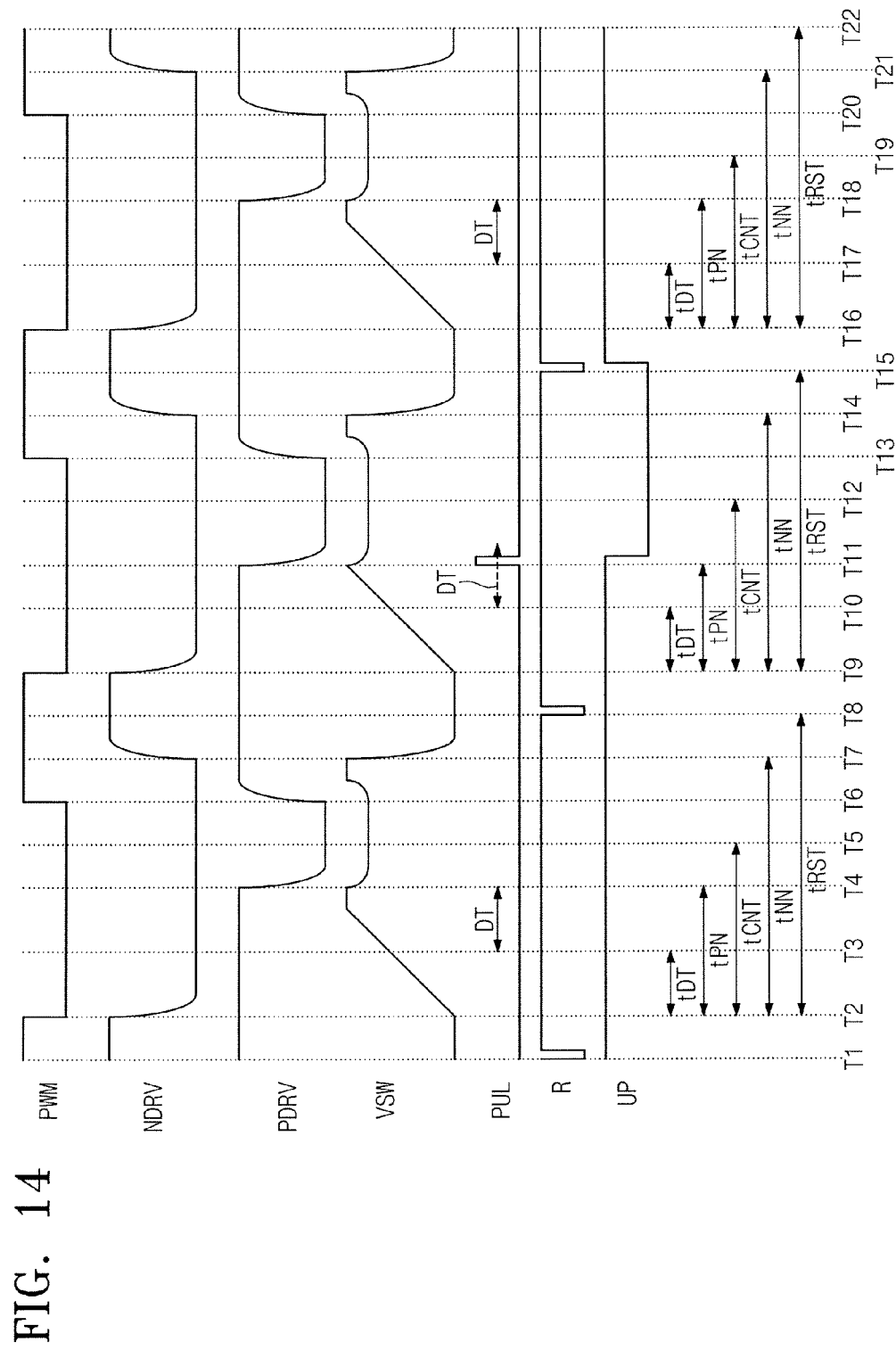
FIGS. 14 and 15 show waveforms of internal signals of a first switch controller and signals associated with the first switch controller according to an exemplary embodiment of the present inventive concept.
Figure 15:
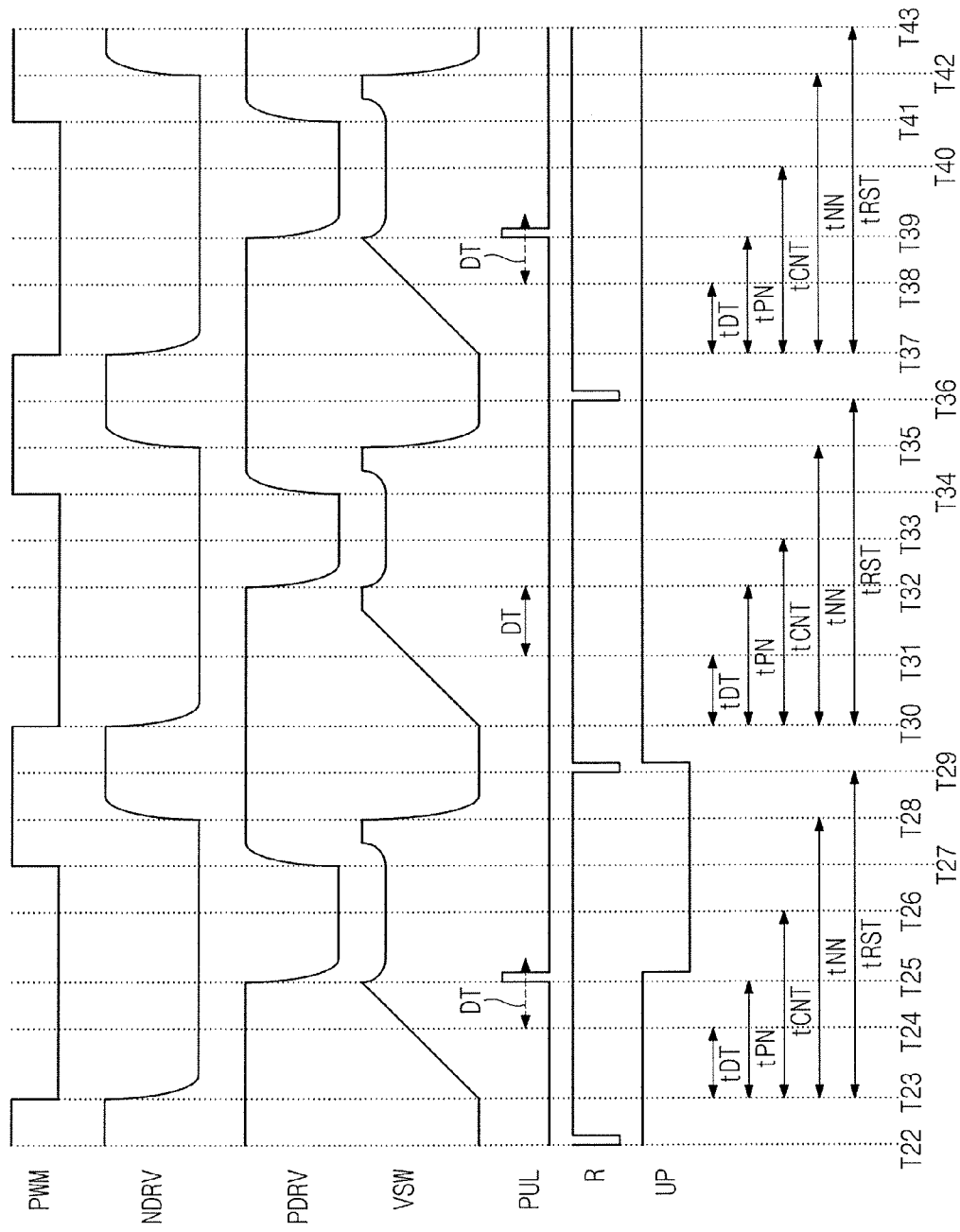

FIGS. 14 and 15 show waveforms of internal signals of a first switch controller 230 and signals associated with the first switch controller 230 according to an exemplary embodiment of the present inventive concept.

Referring to FIGS. 1, 4, 14, and 15, at T1, a reset signal R is activated and a voltage of the input node UP of the counter 134 has a high level.

At T2, the pulse width modulation signal PWM transitions to a low level. When the pulse width modulation signal PWM transitions to a low level, the second control signal NDRV is inactivated to a low level, and the switch voltage VSW starts to rise. A detection period DT starts from T3 when a detection time tDT elapses from T2. A pulse signal PUL maintains a low level because the switch voltage VSW reaches the target level before the first control signal PDRV is activated. The first control signal PDRV is activated to a low level at T4 when a first time tPN elapses from T2. At T5 when a count time tCNT elapses from T2, the counter 134 adjusts a delay count DC. In this case, the delay count DC is decreased because the voltage of the input node UP has a high level, and thus, the first time tPN is shortened. The delay count DC or the first time tPN, which is adjusted, is applied to a next period of the pulse width modulation signal PWM. At T6, the pulse width modulation signal PWM transitions to a high level, and the first control signal PDRV is inactivated to a high level. The switch voltage VSW rises due to the virtual diode. At T7 when a second time tNN elapses from T2, the second control signal NDRV is activated to a high level, and the switch voltage VSW falls to the ground voltage VSS. At T8 when a reset time tRST elapses from T2, the reset signal R is activated and the voltage of the input node UP of the counter 134 has a high level.

At T9, the pulse width modulation signal PWM transitions to a low level. When the pulse width modulation signal PWM transitions to a low level, the second control signal NDRV is inactivated to a low level, and the switch voltage VSW starts to rise. The detection period DT starts from T10 when the detection time tDT elapses from T9. The pulse signal PUL is activated because the switch voltage VSW does not reach the target level before the first control signal PDRV is activated (e.g., T11). The voltage of the input node UP transitions to a low level in response to the activation of the pulse signal PUL. The first control signal PDRV is activated at T11 when the first time tPN elapses from T9. At T12 when the count time tCNT elapses from T9, the counter 134 adjusts the delay count DC. In this case, the delay count DC is increased because the voltage of the input node UP has a low level, and thus, the first time tPN is increased. The delay count DC or the first time tPN, which is adjusted, is applied to a next period of the pulse width modulation signal PWM. At T13, the pulse width modulation signal PWM transitions to a high level, and the first control signal PDRV is inactivated to a high level. The switch voltage VSW rises due to the virtual diode. At T14 when the second time tNN elapses from T9, the second control signal NDRV is activated to a high level, and the switch voltage VSW falls to the ground voltage VSS. The reset signal R is activated at T15 when the reset time tRST elapses from T9. The voltage of the input node UP of the counter 134 transitions to a high level in response to the activation of the reset signal R.

At T16, the pulse width modulation signal PWM transitions to a low level. When the pulse width modulation signal PWM transitions to a low level, the second control signal NDRV is inactivated to a low level, and the switch voltage VSW starts to rise. The detection period DT starts from T17 when the detection time tDT elapses from T16. The pulse signal PUL maintains a low level because the switch voltage VSW reaches the target level before the first control signal PDRV is activated. The first control signal PDRV is activated to a low level at T18 when the first time tPN elapses from T16. At T19 when the count time tCNT elapses from T16, the counter 134 adjusts the delay count DC. The delay count DC is decreased because the voltage of the input node UP has a high level, and thus, the first time tPN is decreased. The delay count DC or the first time tPN which is adjusted, is applied to a next period of the pulse width modulation signal PWM. At T20, the pulse width modulation signal PWM transitions to a high level, and the first control signal PDRV is inactivated to a high level. The switch voltage VSW rises due to the virtual diode. At T21 when the second time tNN elapses from T16, the second control signal NDRV is activated to a high level, and the switch voltage VSW falls to the ground voltage VSS. At T22 when the reset time tRST elapses from T16, the reset signal R is activated and the voltage of the input node UP of the counter 134 has a high level.

At T23, the pulse width modulation signal PWM transitions to a low level. When the pulse width modulation signal PWM transitions to a low level, the second control signal NDRV is inactivated to a low level, and the switch voltage VSW starts to rise. The detection period DT starts from T24 when the detection time tDT elapses from T23. The pulse signal PUL is activated because the switch voltage VSW does not reach the target level before the first control signal PDRV is activated (e.g., at T25). The voltage of the input node UP transitions to a low-level voltage in response to the activation of the pulse signal PUL. The first control signal PDRV is activated to a low level at T25 when the first time tPN elapses from T23. At T26 when the count time tCNT elapses from T23, the counter 134 adjusts the delay count DC. The delay count DC is increased because the voltage of the input node UP has a low level, and thus, the first time tPN is increased. The delay count DC or the first time tPN, which is adjusted, is applied to a next period of the pulse width modulation signal PWM. At T27, the pulse width modulation signal PWM transitions to a high level, and the first control signal PDRV is inactivated to a high level. The switch voltage VSW rises due to the virtual diode. At T28 when the second time tNN elapses from T23, the second control signal NDRV is activated to a high level, and the switch voltage VSW falls to the ground voltage VSS. The reset signal R is activated at T29 when the reset time tRST elapses from T23. The voltage of the input node UP of the counter 134 transitions to a high level voltage in response to the activation of the reset signal R.

From T30 to T36, the switch voltage VSW reaches the target level before the first control signal PDRV is activated (e.g., at T32). Thus, the delay count DC or the first time tPN is decreased without activation of the pulse signal PUL.

From T37 to T43, the switch voltage VSW does not reach the target level before the first control signal PDRV is activated (e.g., at T39). Thus, the pulse signal PUL is activated at T39, and the delay count DC or the first time tPN is increased.

Figure 16:
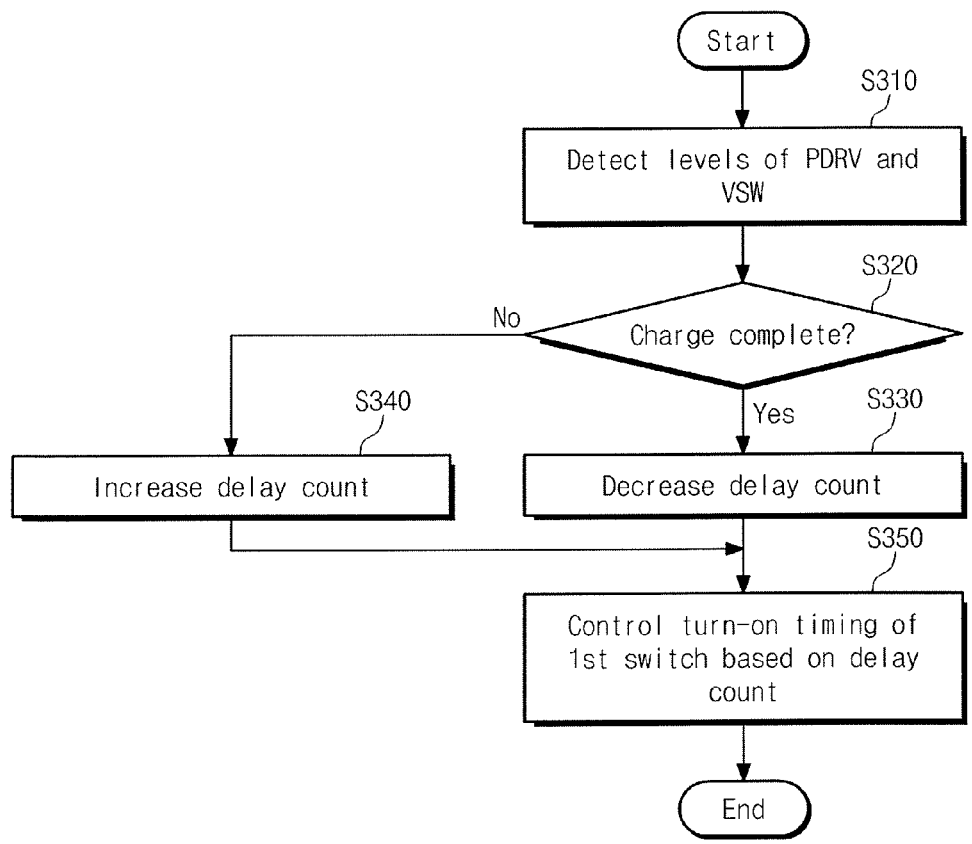
FIG. 16 is a flow chart showing an operating method of a voltage converter according to an exemplary embodiment of the present inventive concept.

FIG. 16 is a flow chart showing an operating method of a voltage converter 200 according to an exemplary embodiment of the present inventive concept. Referring to FIGS. 12 and 16, in a step S310, levels of the first control signal PDRV and the switch voltage VSW are detected.

In a step S320, whether charging of the switch voltage VSW is completed is determined. For example, whether the switch voltage VSW reaches a target level before the first control signal PDRV is activated is determined. If the switch voltage VSW reaches the target level before the first control signal PDRV is activated, a delay count DC is decreased in a step S330. If the switch voltage VSW does not reach the target level before the first control signal PDRV is activated, the delay count DC is increased in a step S340.

In a step S350, a turn-on timing of the first switch 210 is adjusted based on the delay count DC which is adjusted in the step S330 or S340. For example, the turn-on timing of the first switch 210 may be delayed when the delay count DC is increased and the turn-on timing of the first switch 210 may be advanced when the delay count DC is decreased.

Figure 17:
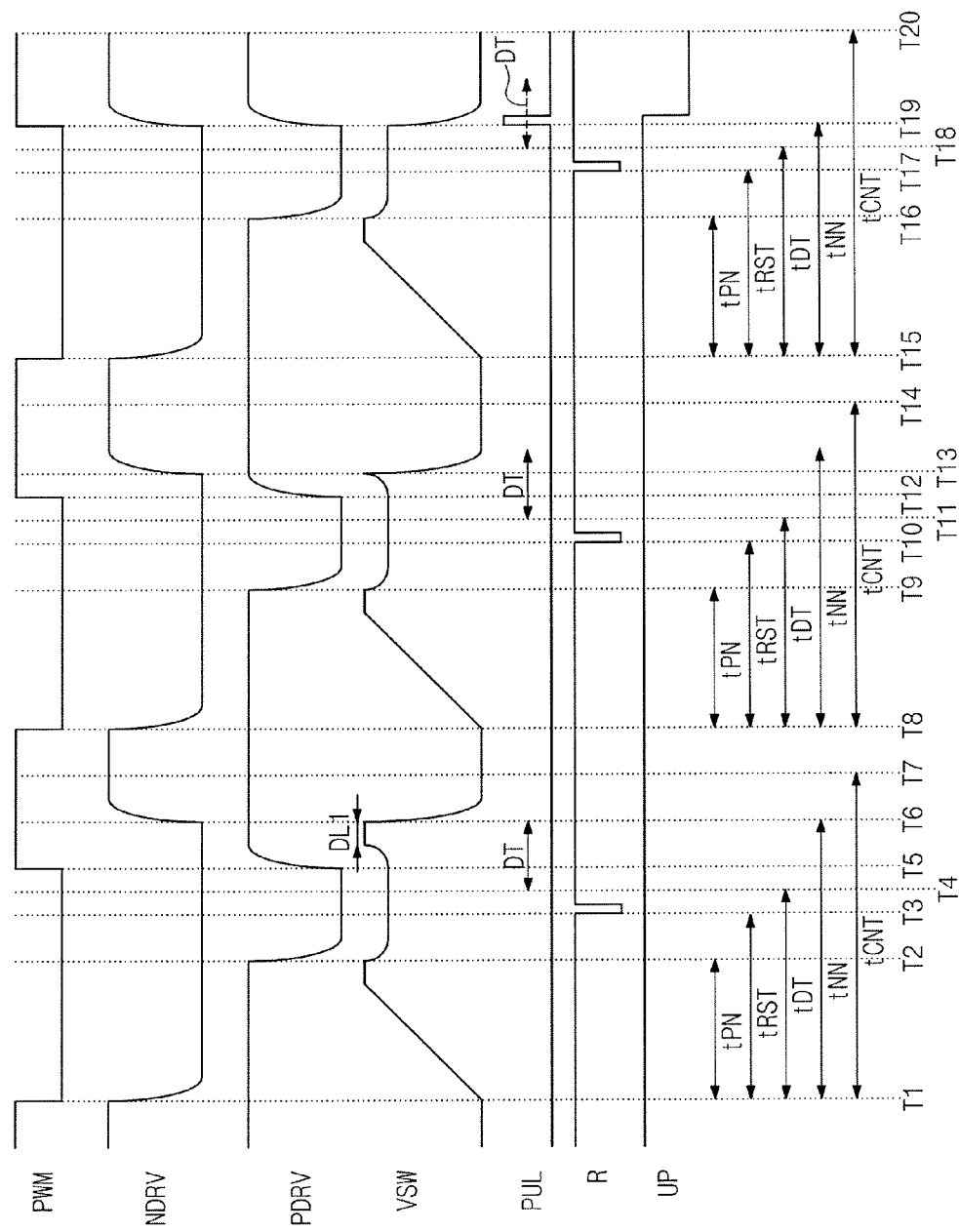
FIGS. 17 and 18 show waveforms of internal signals of a second switch controller and signals associated with the second switch controller according to an exemplary embodiment of the present inventive concept.
Figure 18:
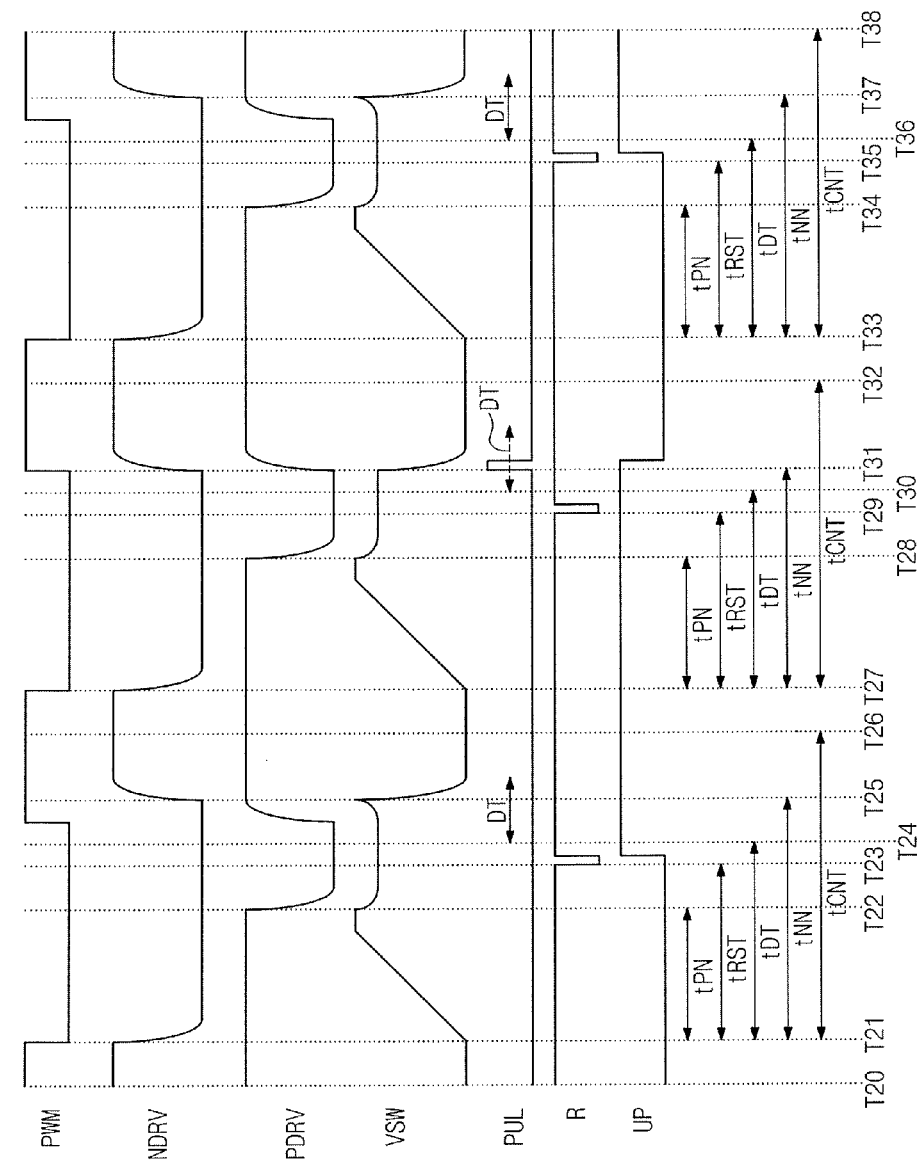

FIGS. 17 and 18 show waveforms of internal signals of a second switch controller 240 and signals associated with the second switch controller 240 according to an exemplary embodiment of the present inventive concept. Referring to FIGS. 1, 8, 17, and 18, at T1, a pulse width modulation signal PWM transitions to a low level. At this time, a second control signal NDRV is inactivated to a low level, and a switch voltage VSW starts to rise. A first control signal PDRV is activated to a high level at T2 when a first time tPN elapses from T1. At T3 when a reset time tRST elapses from T1, a reset signal R is activated and a voltage of the input node UP of the counter 144 has a high level. A detection time DT starts from T4 when a detection time tDT elapses from T1. A pulse signal PUL maintains a low level because an activation timing (e.g., T6) of the second control signal NDRV is later than an inactivation timing (e.g., T2) of the first control signal PDRV. At T5, the pulse width modulation signal PWM transitions to a high level, and the first control signal PDRV is inactivated to a high level. The second control signal NDRV is activated at T6 when a second time tNN elapses from T1. A delay count DC is adjusted at T7 when a count time tCNT elapses from T1. Since the voltage of the input node UP has a high level, the delay count DC is decreased, and thus, the second time tNN is shortened.

From T8 to T14, an activation timing (e.g., T13) of the second control signal NDRV is later than an inactivation timing (e.g., T12) of the first control signal PDRV. Thus, the pulse signal PUL maintains a low level and the delay count DC is decreased, and thus, the second time tNN is shortened.

At T15, the pulse width modulation signal PWM transitions to a low level. At this time, the second control signal NDRV is inactivated to a low level, and the switch voltage VSW starts to rise. The first control signal PDRV is activated to a low level at T16 when the first time tPN elapses from T15. At T17 when the reset time tRST elapses from T15, the reset signal R is activated and the voltage of the input node UP of the counter 144 has a high level. The detection time DT starts from T18 when the detection time tDT elapses from T15. The pulse signal PUL is activated because an activation timing (e.g., T19) of the second control signal NDRV is not later than an inactivation timing (e.g., T19) of the first control signal PDRV. For example, at T19 when the second time tNN elapses from T15, the pulse width modulation signal PWM transitions to a high level, the first control signal PDRV is inactivated to a high level, and the second control signal NDRV is activated. The delay count DC is adjusted at T20 when the count time tCNT elapses from T15. Since the voltage of the input node UP has a low level, the delay count DC is increased, and thus, the second time tNN is increased.

Referring to FIG. 18, from T21 to T26, an activation timing (e.g., T25) of the second control signal NDRV is later than an inactivation timing of the first control signal PDRV. Thus, the pulse signal PUL maintains a low level and the delay count DC is decreased, and thus, the second time tNN is shortened.

From T27 to T32, an activation timing (e.g., T31) of the second control signal NDRV is not later than an inactivation timing (e.g., T31) of the first control signal PDRV. Thus, the pulse signal PUL is activated and the delay count DC is increased, and thus, the second time tNN is increased.

From T33 to T38, an activation timing (e.g., T37) of the second control signal NDRV is later than an inactivation timing of the first control signal PDRV. Thus, the pulse signal PUL maintains a low level and the delay count DC is decreased, and thus, the second time tNN is shortened.

Figure 19:
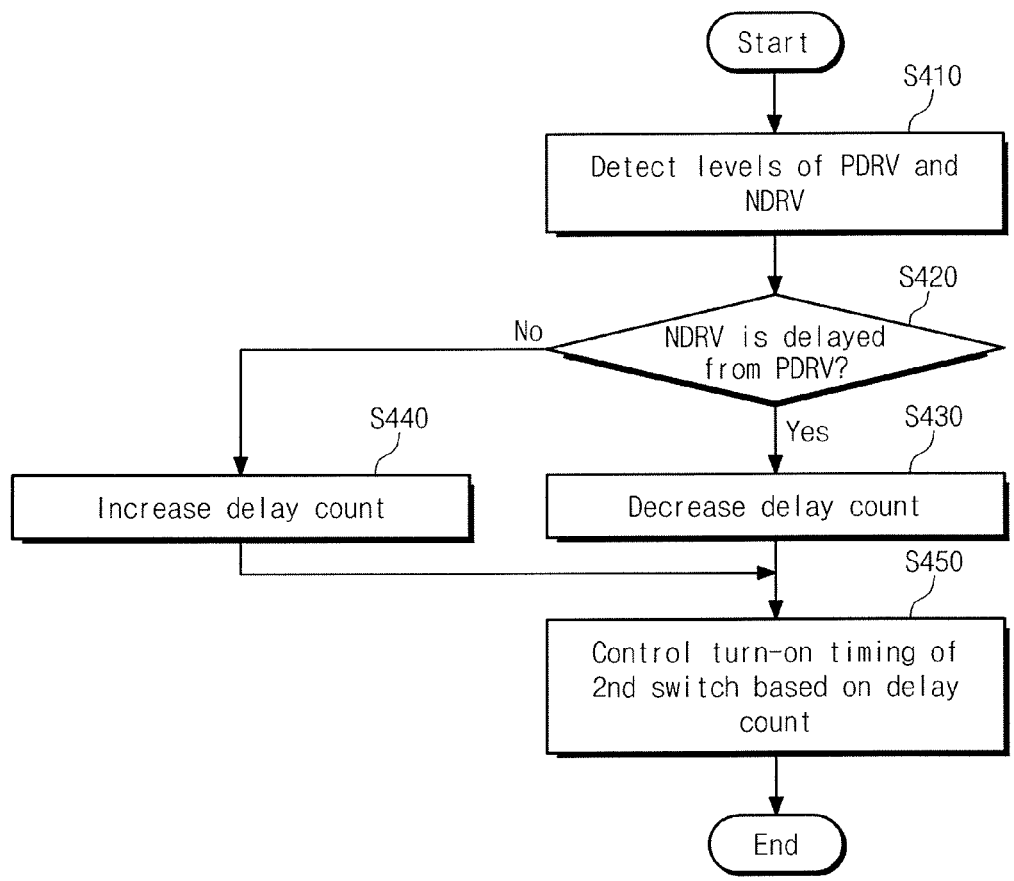
FIG. 19 is a flow chart showing an operating method of a voltage converter according to an exemplary embodiment of the present inventive concept.

FIG. 19 is a flow chart showing an operating method of a voltage converter 200 according to an exemplary embodiment of the present inventive concept. Referring to FIGS. 12 and 19, in a step S410, levels of the first and second control signals PDRV and NDRV are detected.

In a step S420, there is determined whether an activation timing of the second control signal NDRV is later than an inactivation timing of the first control signal PDRV. If the activation timing of the second control signal NDRV is later than the inactivation timing of the first control signal PDRV, a delay count DC is decreased in a step S430. If the activation timing of the second control signal NDRV is not later than the inactivation timing of the first control signal PDRV, the delay count DC is increased in a step S440.

In a step S450, a turn-on timing of the second switch 210 is adjusted based on the delay count DC which is adjusted in the step S430 or S440. For example, the turn-on timing of the second switch 220 may be delayed when the delay count DC is increased and the turn-on timing of the second switch 220 may be advanced when the delay count DC is decreased.

Figure 20:
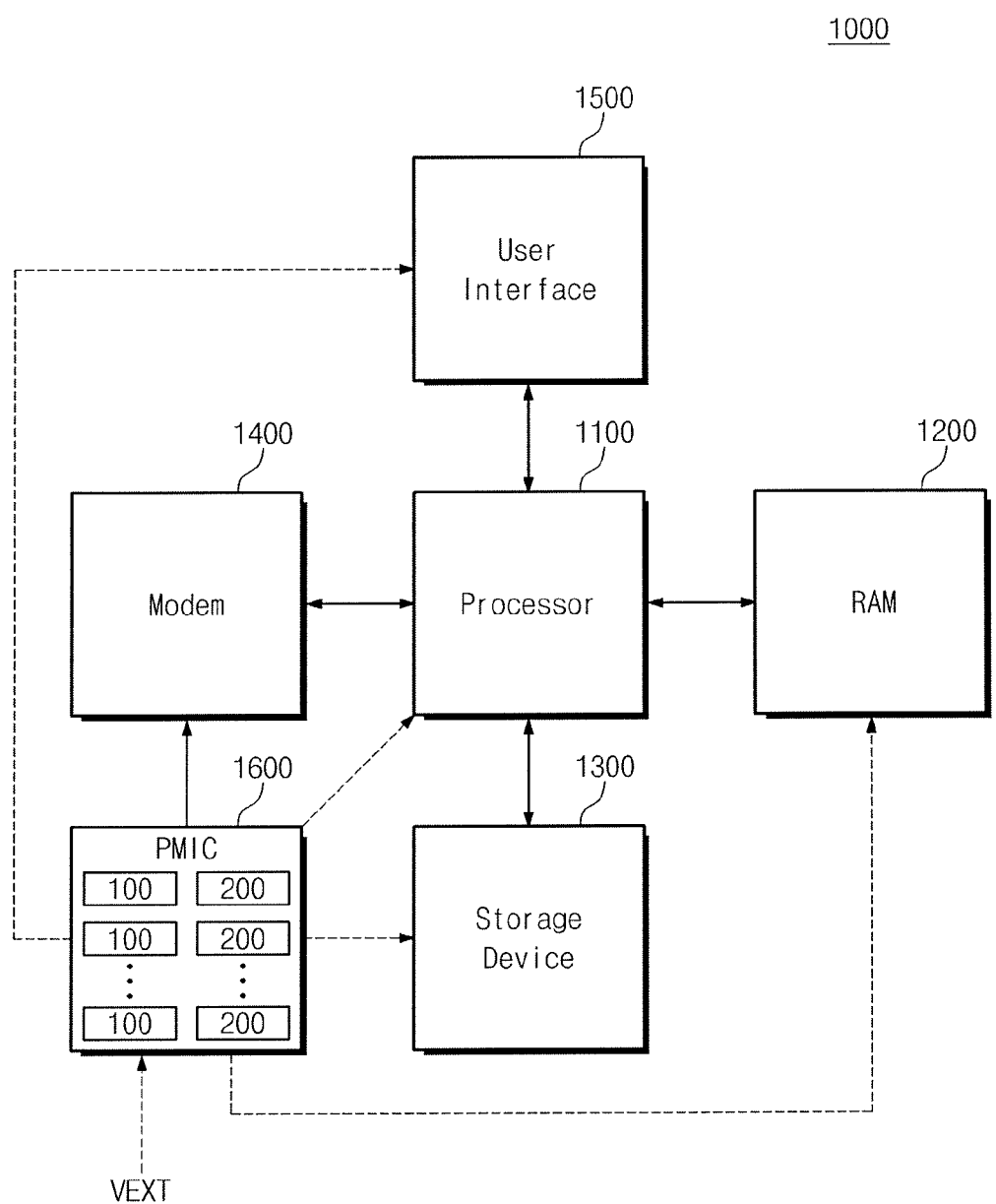
FIG. 20 is a block diagram illustrating a computing device according to an exemplary embodiment of the present inventive concept.

FIG. 20 is a block diagram illustrating a computing device 1000 according to an exemplary embodiment of the present inventive concept. Referring to FIG. 20, the computing device 1000 includes a processor 1100, a random access memory (RAM) 1200, a storage device 1300, a modem 1400, a user interface 1500, and a power management block 1600.

The processor 1100 controls an overall operation of the computing device 1000 and performs a logical operation. The processor 1100 may be formed of a system-on-chip (SoC). The processor 1100 may be a general purpose processor, a specific-purpose processor, an application processor, or the like.

The RAM 1200 communicates with the processor 1100. The RAM 1200 may be a main memory of the processor 1100 or the computing device 1000. The processor 1100 temporarily stores codes or data in the RAM 1200. The processor 1100 may execute the codes using the RAM 1200 to process the data. The processor 1100 may execute a variety of software such as an operating system, an application, or the like, using the RAM 1200. However, the software is not limited thereto. The processor 1100 controls an overall operation of the computing device 1000 using the RAM 1200. The RAM 1200 may include a volatile memory such as, but not limited to, a static RAM, a dynamic RAM, a synchronous DRAM, or the like, or a nonvolatile memory such as, but not limited to, a phase-change RAM (PRAM), a magnetic RAM (MRAM), a resistive RAM (RRAM), a ferroelectric RAM (FRAM), or the like.

The storage device 1300 communicates with the processor 1100. The storage device 1300 stores data long-term. For example, the processor 110 stores data to be stored long-term (hereinafter, referred to as long-term data) in the storage device 1300. The storage device 1300 may store a boot image for driving the computing device 1000. The storage device 1300 may store source codes of a variety of software such as an operating system, an application, or the like. The storage device 1300 may store data that is processed by the variety of software such as the operating system, the application, or the like.

In an exemplary embodiment of the present inventive concept, the processor 1100 may load source codes stored in the storage device 1300 on the RAM 1200. The codes loaded on the RAM 1200 may be executed to run the variety of software such as the operating system, the application, or the like. The processor 1100 may load the data stored in the storage device 1300 on the RAM 1200 and process the data loaded on the RAM 1200. The processor 1100 stores long-term data stored in the RAM 1200 into the storage device 1300.

The storage device 1300 may include a nonvolatile memory such as, but not limited to, a flash memory, a PRAM, an MRAM, an RRAM, an FRAM, or the like.

The modem 1400 communicates with an external device according to a control of the processor 1100. For example, the modem 1400 communicates with the external device in a wire or wireless manner. The modem 1400 may communicate with the external device, based on at least one of wireless communications manners such as long-term evolution (LTE), world-wide interoperability for microwave access (WiMAX), global system for mobile communication (GSM), code division multiple access (CDMA), Bluetooth, near field communication (NFC), WiFi, radio frequency identification (RFID), or the like, or wire communications manners such as universal serial bus (USB), serial advanced technology attachment (SATA), high speed interchip (HSIC), small computer system interface (SCSI), Firewire, peripheral component interconnection (PCI), PCI express (PCIe), nonvolatile memory express (NVMe), universal flash storage (UFS), secure digital (SD), secure digital input/output (SDIO), universal asynchronous receiver transmitter (UART), serial peripheral interface (SPI), high speed SPI (HS-SPI), RS232, inter-integrated circuit (I2C), high speed I2C (HS-I2C), integrated-interchip sound (I2S), Sony/Philips digital interface (S/PDIF), multimedia card (MMC), embedded MMC (eMMC), or the like.

The user interface 1500 communicates with a user according to a control of the processor 1100. For example, the user interface 1500 may include user input interfaces such as a keyboard, a keypad, a button, a touch panel, a touch screen, a touch pad, a touch ball, a camera, a microphone, a gyroscope sensor, a vibration sensor, or the like. The user interface 1500 may further include user output interfaces such as a liquid crystal display (LCD) device, an organic light emitting diode (OLED) display device, an active matrix OLED (AMOLED) display device, an LED, a speaker, a motor, or the like.

The power management block 1600 receives an external voltage VEXT. The power management block 1600 generates various levels of voltages by means of the external voltage VEXT and supplies the voltages to the processor 1100, the RAM 1200, the storage device 1300, modem 1400, and the user interface 1500. The power management block 1600 includes voltage converters 100 according to exemplary embodiment of the present inventive concept for lowering the external voltage VEXT. The power management block 1600 includes voltage converters 200 according to an exemplary embodiment of the present inventive concept for boosting the external voltage VEXT. Power efficiency of the computing device 100 may be increased by using the voltage converters 100 and 200 according to an exemplary embodiment of the present inventive concept.

In an exemplary embodiment of the present inventive concept, the computing device 1000 may include smart devices, such as a smartphone, a smart pad, a smart camera, a smart television, or the like. The computing device 1000 may include general-purpose computers, such as a desktop computer, a laptop computer, or the like.

While the present inventive concept has been described with reference to exemplary embodiments thereof, it will be understood that various changes in form and detail may be made therein without departing from the spirit and scope of the present inventive concept as defined by the following claims.

What is claimed is:

1. A voltage converter comprising:
   a first charging element connected between an output node and a switch node;
   a second charging element connected between the output node and a ground node;
   a first switch configured to control a connection between an input node supplied with an input voltage and the switch node in response to a first control signal;
   a second switch configured to control a connection between the switch node and the ground node in response to a second control signal;
   a first switch controller configured to adjust a first activation timing of the first control signal in response to a pulse width modulation signal, the first control signal, and the second control signal, and to activate the first control signal using the adjusted first activation timing, the first control signal and the second control signal being input to the first switch controller directly; and
   a second switch controller configured to adjust a second activation timing of the second control signal in response to the pulse width modulation signal, a switch signal of the switch node, and the second control signal, and to activate the second control signal using the adjusted second activation timing, the switch signal and the second control signal being input to the second switch controller directly.

2. The voltage converter of claim 1, wherein the second switch controller advances the second activation timing when a level of the switch signal is lower than a ground voltage upon activation of the second control signal.

3. The voltage converter of claim 1, wherein the second switch controller delays the second activation timing when a level of the switch signal is not lower than a ground voltage upon activation of the second control signal.

4. The voltage converter of claim 1, wherein the second switch controller outputs the second control signal obtained by conducting a logical operation between the pulse width modulation signal and a delay signal of the pulse width modulation signal and inverting a result of the logical operation, and
   wherein the second switch controller adjusts the second activation timing by changing an amount of delay between the pulse width modulation signal and the delay signal of the pulse width modulation signal.

5. The voltage converter of claim 1, wherein the second switch controller includes:
   a first pulse generator configured to receive the second control signal and the switch signal and to output a pulse signal when a level of the switch signal is not lower than a ground voltage upon activation of the second control signal;
   a second pulse generator configured to output a reset signal in response to the pulse width modulation signal;
   a flip-flop configured to receive the pulse signal and the reset signal, and to output an output signal;
   a counter configured to decrease a delay count when the output signal has a first level, to increase the delay count when the output signal has a second level different from the first level, and to output the delay count, wherein the increasing or the decreasing of the delay count is synchronized with the pulse width modulation signal;
   a delay unit configured to receive the pulse width modulation signal and to delay the pulse width modulation signal using a plurality of delays in the delay unit;
   a decoder configured to select, as a delay signal, one of outputs of the plurality of delays in response to the delay count;
   a logical gate configured to conduct a logical operation between the pulse width modulation signal and the delay signal; and
   an inverter configured to invert an output of the logical gate to output the inverted signal as the second control signal.

6. The voltage converter of claim 1, wherein the first switch controller delays the first activation timing when the first control signal is activated upon inactivation of the second control signal.

7. The voltage converter of claim 1, wherein the first switch controller advances the first activation timing when the first control signal is not activated upon inactivation of the second control signal.

8. The voltage converter of claim 1, wherein the first switch controller outputs the first control signal obtained by conducting a logical operation between the pulse width modulation signal and a delay signal of the pulse width modulation signal and inverting a result of the logical operation; and
   wherein the first switch controller adjusts the first activation timing by changing an amount of delay between the pulse width modulation signal and the delay signal of the pulse width modulation signal.

9. The voltage converter of claim 1, wherein the first switch controller includes:
   a first pulse generator configured to receive the first control signal and the second control signal and to output a pulse signal when the first control signal is activated upon inactivation of the second control signal;
   a second pulse generator configured to output a reset signal in response to the pulse width modulation signal;
   a flip-flop configured to receive the pulse signal and the reset signal, and to output an output signal;
   a counter configured to decrease a delay count when the output signal has a first level, to increase the delay count when the output signal has a second level different from the first level, and to output the delay count, wherein the increasing or the decreasing of the delay count is synchronized with the pulse width modulation signal;
   a delay unit configured to receive the pulse width modulation signal and to delay the pulse width modulation signal using a plurality of delays in the delay unit;
   a decoder configured to select, as a delay signal, one of outputs of the plurality of delays in response to the delay count;
   a logical gate configured to conduct a logical operation between the pulse width modulation signal and the delay signal; and
   an inverter configured to invert an output of the logical gate to output the inverted signal as the first control signal.

10. The voltage converter of claim 1, further comprising:
a feedback controller configured to generate a control signal according to a level of the switch signal; and
a pulse width modulation signal generator configured to adjust a pulse width of the pulse width modulation signal in response to the control signal.

11. A voltage converter comprising:
a first charging element connected between an input node, supplied with an input voltage, and a switch node;
a second charging element connected between an output node and a ground node;
a first switch configured to control a connection between the output node and the switch node in response to a first control signal;
a second switch configured to control a connection between the switch node and the ground node in response to a second control signal;
a first switch controller configured to adjust a first activation timing of the first control signal in response to a pulse width modulation signal, a switch signal of the switch node, and the first control signal and to activate the first control signal using the adjusted first activation timing, the switch signal and the first control signal being input to the first switch controller directly; and
a second switch controller configured to adjust a second activation timing of the second control signal in response to the pulse width modulation signal, the first control signal, and the second control signal and to activate the second control signal using the adjusted second activation timing, the first control signal and the second control signal being input to the second switch controller directly.

12. The voltage converter of claim 11, wherein the first switch controller advances the first activation timing when a level of the switch signal reaches a target level before the first control signal is activated.

13. The voltage converter of claim 11, wherein the first switch controller delays the first activation timing when a level of the switch signal does not reach a target level before the first control signal is activated.

14. The voltage converter of claim 11, wherein the first switch controller includes:
a first pulse generator configured to receive the first control signal and the switch signal and to output a pulse signal when a level of the switch signal does not reach a target level before the first control signal is activated;
a second pulse generator configured to output a reset signal in response to the pulse width modulation signal;
a flip-flop configured to receive the pulse signal and the reset signal, and to output an output signal;
a counter configured to decrease a delay count when the output signal has a first level, to increase the delay count when the output signal has a second level different from the first level, and to output the delay count, wherein the increasing or the decreasing of the delay count is synchronized with the pulse width modulation signal;
a delay unit configured to receive the pulse width modulation signal and to delay the pulse width modulation signal using a plurality of delays in the delay unit;
a decoder configured to select, as a delay signal, one of outputs of the plurality of delays in response to the delay count;
a logical gate configured to conduct a logical operation between the pulse width modulation signal and the delay signal; and
an inverter configured to invert an output of the logical gate to output the inverted signal as the first control signal.

15. The voltage converter of claim 11, wherein the second switch controller advances the second activation timing when the second control signal is at an inactive state upon inactivation of the first control signal.

16. The voltage converter of claim 11, wherein the second switch controller delays the second activation timing when the second control signal is activated upon inactivation of the first control signal.

17. The voltage converter of claim 11, wherein the second switch controller includes:
a first pulse generator configured to receive the first control signal and the second control signal and to output a pulse signal when the second control signal is activated upon inactivation of the first control signal;
a second pulse generator configured to output a reset signal in response to the pulse width modulation signal;
a flip-flop configured to receive the pulse signal and the reset signal, and to output an output signal;
a counter configured to decrease a delay count when the output signal has a first level, to increase the delay count when the output signal has a second level different from the first level, and to output the delay count, wherein the increasing or the decreasing of the delay count is synchronized with the pulse width modulation signal;
a delay unit configured to receive the pulse width modulation signal and to delay the pulse width modulation signal using a plurality of delays in the delay unit;
a decoder configured to select, as a delay signal, one of outputs of the plurality of delays in response to the delay count;
a logical gate configured to conduct a logical operation between the pulse width modulation signal and the delay signal; and
an inverter configured to invert an output of the logical gate to output the inverted signal as the second control signal.

18. A method of operating a voltage converter including a first switch and a second switch serially connected to the first switch via a switch node, the method comprising:
detecting, by a switch controller of the first and second switches, a first signal for controlling the first switch, a second signal for controlling the second switch, and a third signal at the switch node;
controlling, by the switch controller, a turn-on timing of the first switch based on whether the first signal is delayed from the second signal; and
controlling, by the switch controller, a turn-on timing of the second switch based on whether the third signal is lower than a ground voltage,
wherein the switch controller receives the first and second signals directly to control the turn-on timing of the first switch, and receives and compares the second and third signals directly to control the turn-on timing of the second switch.

19. The method of claim 18, wherein the controlling of the turn-on timing of the first switch includes quickening the turn-on timing of the first switch when the first signal is delayed from the second signal and delaying the turn-on timing of the first switch when the first signal is not delayed from the second signal, and
wherein the controlling of the turn-on timing of the second switch includes quickening a turn-on timing of the second switch when the third signal is lower than a ground voltage and delaying the turn-on timing of the second switch when the third signal is not lower than the ground voltage.

* * * * *